US008317601B1

(12) United States Patent

Luciano, Jr.

(10) Patent No.: US 8,317,601 B1

(45) Date of Patent: Nov. 27, 2012

(54) BONUS GAME POINTS IN A GAMING ENVIRONMENT

(75) Inventor: Robert Anthony Luciano, Jr., Reno, NV (US)

(73) Assignee: Bally Gaming, Inc., Las Vegas, NV (US)

( * ) Notice: Subject to any disclaimer, the term of this patent is extended or adjusted under 35 U.S.C. 154(b) by 24 days.

(21) Appl. No.: 09/971,853

(22) Filed: Oct. 4, 2001

Related U.S. Application Data

(63) Continuation-in-part of application No. 09/788,168, filed on Feb. 15, 2001, now Pat. No. 6,758,757, which is a continuation-in-part of application No. 09/742,679, filed on Dec. 20, 2000, now Pat. No. 6,923,721.

(51) Int. Cl.

*A63F 9/24* (2006.01)
*A63F 13/00* (2006.01)
*G06F 17/00* (2006.01)
*G06F 19/00* (2011.01)

(52) U.S. Cl. ................ 463/25; 463/20; 463/16; 463/40; 463/42

(58) Field of Classification Search .................... 463/16, 463/18, 13, 20, 22, 25, 26, 30, 31, 37, 43–44, 463/46, 40, 41, 42, 1; 273/138.1, 143 R, 273/292

See application file for complete search history.

(56) References Cited

U.S. PATENT DOCUMENTS

| | | | | | |
|---|---|---|---|---|---|
| 4,339,798 | A | | 7/1982 | Hedges et al. | |
| 4,398,720 | A | | 8/1983 | Jones et al. | |
| 4,752,068 | A | * | 6/1988 | Endo | 463/15 |
| 4,858,930 | A | * | 8/1989 | Sato | 463/23 |
| 4,948,138 | A | | 8/1990 | Pease et al. | |
| 5,048,839 | A | * | 9/1991 | Hurst | 273/240 |
| 5,083,271 | A | * | 1/1992 | Thacher et al. | 700/92 |
| 5,129,652 | A | * | 7/1992 | Wilkinson | 273/139 |
| 5,179,517 | A | * | 1/1993 | Sarbin et al. | 463/25 |
| 5,321,241 | A | * | 6/1994 | Craine | 463/25 |
| 5,365,575 | A | | 11/1994 | Katz | |
| 5,370,399 | A | | 12/1994 | Liverance | |
| 5,429,361 | A | | 7/1995 | Raven et al. | |
| 5,470,079 | A | | 11/1995 | LeStrange et al. | |
| 5,472,196 | A | * | 12/1995 | Rusnak | 463/18 |
| 5,573,244 | A | | 11/1996 | Mindes | |
| 5,586,766 | A | | 12/1996 | Forte et al. | |
| 5,627,356 | A | * | 5/1997 | Takemoto et al. | 235/381 |
| 5,743,800 | A | | 4/1998 | Huard et al. | |
| 5,751,707 | A | | 5/1998 | Voit et al. | |
| 5,761,647 | A | * | 6/1998 | Boushy | 705/10 |
| 5,768,382 | A | * | 6/1998 | Schneier et al. | 380/251 |
| 5,770,533 | A | * | 6/1998 | Franchi | 463/42 |
| 5,816,918 | A | | 10/1998 | Kelly et al. | |
| 5,830,068 | A | | 11/1998 | Brenner et al. | |
| 5,836,817 | A | | 11/1998 | Acres et al. | |
| 5,876,284 | A | * | 3/1999 | Acres et al. | 463/25 |
| 5,997,401 | A | * | 12/1999 | Crawford | 463/20 |
| 5,999,808 | A | | 12/1999 | LaDue | |
| 6,012,832 | A | * | 1/2000 | Saunders et al. | 235/375 |

(Continued)

*Primary Examiner* — Paul A D'Agostino

(74) *Attorney, Agent, or Firm* — Steptoe & Johnson LLP

(57) ABSTRACT

A system and method for using bonus points, where bonus points may be accumulated by a player in a casino setting to invoke a bonus play or bonus game ordinarily reachable only through a random event. Bonus points are usable in combination with tiered bonus levels, allowing the issuance of points or credits that a player may accumulate until they have enough to trade-in for a bonus round, event, or game at the chosen level.

8 Claims, 19 Drawing Sheets

U.S. PATENT DOCUMENTS

| | | | | | |
|---|---|---|---|---|---|
| 6,015,344 | A * | 1/2000 | Kelly et al. | 463/16 |
| 6,019,374 | A | 2/2000 | Breeding | |
| 6,024,640 | A | 2/2000 | Walker et al. | |
| 6,048,269 | A * | 4/2000 | Burns et al. | 463/25 |
| 6,061,660 | A * | 5/2000 | Eggleston et al. | 705/14 |
| 6,068,552 | A | 5/2000 | Walker et al. | |
| 6,095,921 | A * | 8/2000 | Walker et al. | 463/20 |
| 6,110,044 | A * | 8/2000 | Stern | 463/29 |
| 6,165,071 | A * | 12/2000 | Weiss | 463/24 |
| 6,178,408 | B1 * | 1/2001 | Copple et al. | 705/14 |
| 6,179,710 | B1 * | 1/2001 | Sawyer et al. | 463/16 |
| 6,203,430 | B1 * | 3/2001 | Walker et al. | 463/20 |
| 6,217,448 | B1 * | 4/2001 | Olsen | 463/25 |
| 6,227,972 | B1 | 5/2001 | Walker et al. | |
| 6,244,958 | B1 | 6/2001 | Acres | |
| 6,278,980 | B1 | 8/2001 | Wendkos | |
| 6,306,038 | B1 | 10/2001 | Graves et al. | |
| 6,311,976 | B1 | 11/2001 | Yoseloff | |
| 6,312,334 | B1 * | 11/2001 | Yoseloff | 463/25 |
| 6,319,122 | B1 | 11/2001 | Packes, Jr. et al. | |
| 6,371,852 | B1 * | 4/2002 | Acres | 463/25 |
| 6,416,406 | B1 * | 7/2002 | Duhamel | 463/12 |
| 6,527,638 | B1 | 3/2003 | Walker et al. | |
| 6,533,273 | B2 * | 3/2003 | Cole et al. | 273/138.1 |
| 6,540,609 | B1 * | 4/2003 | Paige | 463/20 |
| 6,592,456 | B2 * | 7/2003 | Walker et al. | 463/13 |
| 6,605,001 | B1 * | 8/2003 | Tarantino | 463/22 |
| 6,612,574 | B1 | 9/2003 | Cole et al. | |
| 6,612,575 | B1 * | 9/2003 | Cole et al. | 273/138.1 |
| 6,616,531 | B1 * | 9/2003 | Mullins | 463/19 |
| 6,620,045 | B2 * | 9/2003 | Berman et al. | 463/25 |
| 6,656,047 | B1 | 12/2003 | Tarantino et al. | |
| 6,726,563 | B1 * | 4/2004 | Baerlocher et al. | 463/25 |
| 7,192,352 | B2 | 3/2007 | Walker et al. | |
| 7,481,430 | B1 * | 1/2009 | Jackson et al. | 273/138.1 |
| 2001/0009865 | A1 | 7/2001 | Demar et al. | |
| 2002/0036380 | A1 * | 3/2002 | Perrie et al. | 273/146 |

* cited by examiner

Example Award Credit System

Meta-Games According To The Present Invention

Award Credit Accounting With Back End Validation Device

Example Voucher

Gaming Device And Prize Station On One Physical Machine

Award Credits On
Multiple Machines

FIGURE 7: Award Credits In A Networked Environment

Gaming Device Details

Prize Station Device Details

Further Meta-Game Examples

FIGURE 11: Hierarchical Prize Levels

The value of a prize at any level is deemed to be one-half the value of the prizes one level above itself and twice the value of the prizes one level below itself.

Game State Saving Game
With Credits

Game State Saving Game
With Skill Points

General Bearer Instrument (GBI) Service Station

Example Use Of GBI Service Station

Bonus Game Points With One Or More Bonus Games

Bonus Game Points And Multiple Bonus Games Or Gaming Machines

Game Play With Non-Savable Bonus Points

Game Play With Savable Bonus Points

BONUS GAME POINTS IN A GAMING ENVIRONMENT

RELATED APPLICATIONS

This application is a continuation-in-part of application having Ser. No. 09/788,168 and filing date Feb. 15, 2001, now U.S. Pat. No. 6,758,757 which is a continuation-in-part of application having Ser. No. 09/742,679 and filing date 20 Dec. 2000 now U.S. Pat. No. 6,923,721.

BACKGROUND OF THE INVENTION

1. Field of the Invention

This invention pertains generally to gaming systems where game events are based at least in part on random events. More particularly, the present invention relates to a method and apparatus for awarding players bonus game points upon the occurrence of predetermined game events, the bonus game points being accumulated until bonus play is invoked, and where the bonus play is otherwise available only upon the occurrence of game events based at least in part on randomized results.

2. The Prior Art

Gaming devices of various types have been in use for many years. The most common type is the conventional slot. A player operates a slot machine by providing coin or paper monies that are received as game credits towards playing a game on the slot machine. Some machines allow a user to provide game credits in the form of a voucher, a printed coupon or a data card (e.g. magnetic strip or smart card). Once the sufficient amount of game credits has been provided to constitute a wager, the player then initiates the game, normally by pulling a handle or activating a button. If a winning event occurs, where a winning event is defined by the game being played, the slot machine issues a winning amount according to the player's wager and to a predetermined pay scheme. The game results are generally based on randomly generated events. The winning amount issued to the user is provided by a corresponding amount of game credits, which the player may redeem (cash-out) or use for further play on the slot machine. Similar game play and award schemes are provided according to other gaming devices such as video poker machines and keno machines.

Bonus and progressive awards have been introduced as improvements to conventional gaming devices to entice increased game play. A common bonus scheme is to award a player a chance to multiply the player's award winnings on a secondary or bonus stage of the game. Most bonus awards are simply an increased multiple of the primary winnings and are issued as game credits suitable for redemption or further play of the gaming device currently being played. In certain cases where the bonus award is large, manual payout by a casino attendant may be required. In some cases a non-monetary prize (e.g., a car) is made the subject of the bonus award. Like the larger monetary progressive awards, these non-monetary prizes are normally tendered manually by a casino attendant.

Progressive awards, like bonus awards, also normally comprise simple monetary credits, but typically comprise a large jackpot amount. Progressive awards couple more than one gaming machine, where some amount of the money a player spends at each gaming machine goes into a central award or "pot". The players of each coupled machine compete for the progressive award. The overall result is that a significantly larger award can be won by a player playing progressive games at a coupled machine than can be won at an individual gaming machine. Upon the occurrence of a specific game result, the progressive award is issued to the player. Since the progressive award is normally large, it is normally paid manually by a casino attendant or cashier.

Another prior art gaming implementation is known as "investment bonus". An example of this type of game is the 1937 Mills "Bonus Bell" game which provides a primary slot reel game, and a secondary investment bonus game (or "come-on" feature). During play the word "BONUS" could be spelled out by hitting the correct letters in sequence on the first reel for an eighteen (18) coin award. This type of game is generally referred to as an "investment bonus" game, because the player invests in continued play of the same machine to achieve the requirements for the bonus award (e.g., in the Mills' game completing the word "BONUS"). If the player were to terminate play of the investment game prior to completing the requirements for the bonus award (e.g., the player only completes "BON"), the player normally forfeits the player's prior investments ("BON") and must later fulfill the requirements anew. Furthermore, a subsequent player may "take over" a previous player's investment by commencing play of the investment bonus game after the previous player vacates the machine.

Current gaming devices and methods, while suitable for normal award credit payout and one-time non-monetary prize payout, have some particular disadvantages. In particular, current gaming machines do not provide support for any type of graduated method for players to invoke bonus game play or bonus games. Further, current gaming machines do not provide a way to combine results from different gaming machines that are usable to invoke a bonus game or bonus play on another gaming machine. Current systems also fail to provide for a way to combine graduated awards or points leading to a bonus play for later aggregation with the same machine during subsequent play. Present systems also fail to provide graduated inceptives for particular bonus games or play, where more than one bonus game exists on a gaming machine or is otherwise available to a player.

Thus, there is a need for a method and apparatus to enable players using gaming devices to gradually work towards a bonus round, bonus game, or bonus play based on extended game play from more than one machine. There is further a need to be able to differentiate between a plurality of bonus games which may be worked towards during extended gaming.

BRIEF DESCRIPTION OF THE INVENTION

The present invention provides for method and apparatus to award and use incremental steps towards a bonus game or bonus play on a gaming machine. Without the present invention, the only way to invoke bonus play or a bonus game with a casino style gaming machine is to play until a random event occurs which results in the game indicia matching, in the game's payout table, the configuration needed to invoke the desired bonus.

The present invention creates bonus points. Bonus points may be accumulated and redeemed, during play or at a kiosk, for bonus game plays or eligibility for a bonus game, tournament game, etc. Bonus points are a unit derived in conjunction with the underlying payout structure and paytables of gaming machines in a casino where these factors (as well as promotional considerations) are combined and incorporated into gaming machine payout tables so that a player receives bonus points at a significantly higher frequency than directly winning the bonus play or bonus game to which the bonus points apply. In the preferred embodiment, the bonus games are always directly winnable as well. The intent of bonus points is to make an apparently rare random win of a bonus event become more accessible to regular players by providing an alternate method of achieving the same result.

DETAILED DESCRIPTION OF THE PREFERRED EMBODIMENTS

Figure 1:
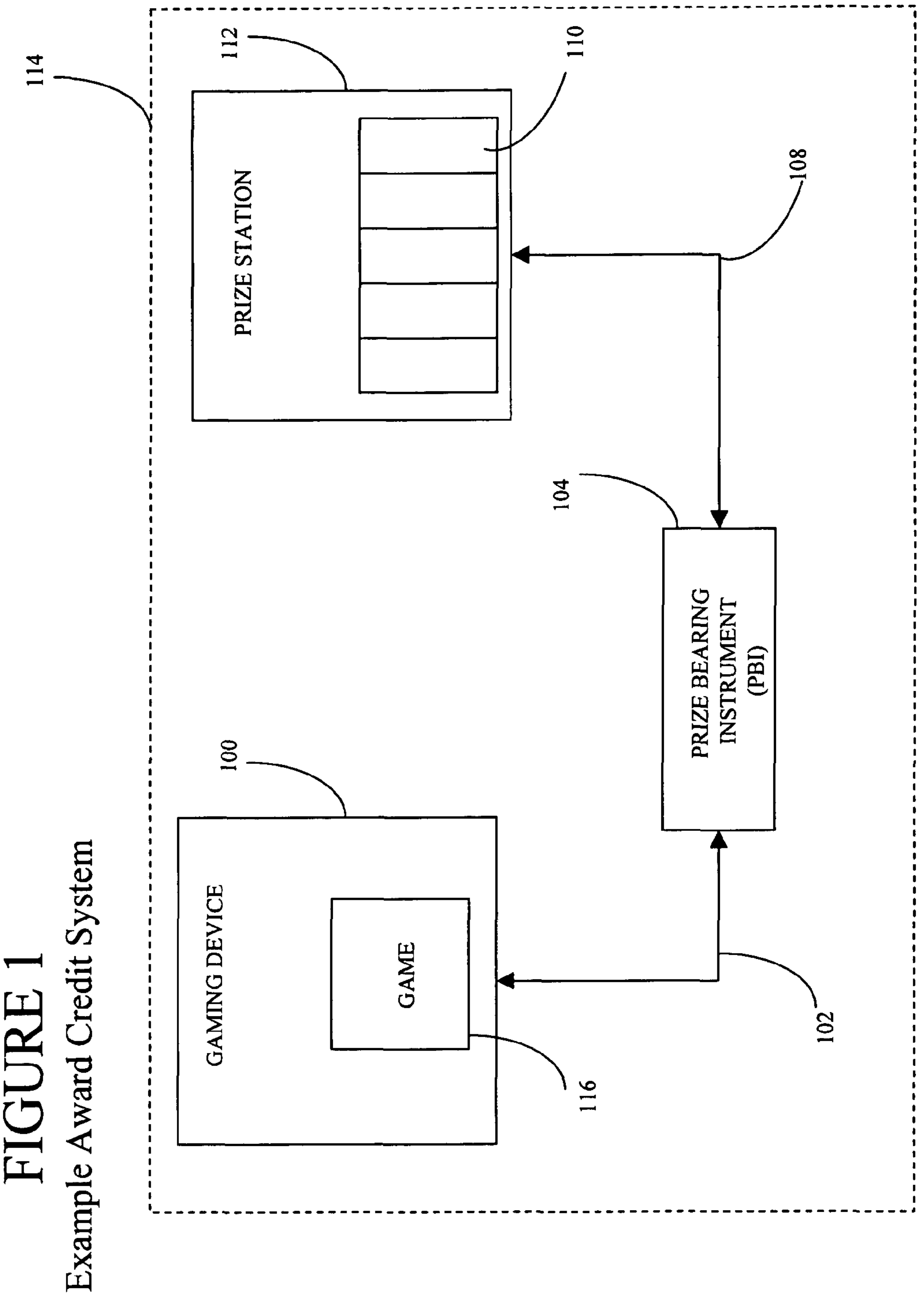
FIG. 1 is a functional block diagram of an example system for maintaining award game states in accordance with the present invention.

Persons of ordinary skill in the art will realize that the following description of the present invention is illustrative only and not in any way limiting. Other embodiments of the invention will readily suggest themselves to such skilled persons having the benefit of this disclosure.

Referring to the drawings, for illustrative purposes the present invention is shown embodied in FIG. 1 through FIG. 19. It will be appreciated that the apparatus may vary as to configuration and as to details of the parts, and that the method may vary as to details and the order of the acts, without departing from the inventive concepts disclosed herein.

Referring first to FIG. 1, a block diagram of an example system for maintaining a player's award credit state is shown. System 114 includes a gaming device 100 and a prize station 112. Gaming device 100 comprises a conventional game of chance, such as a slot machine, video poker machine, video lottery device, keno machine, bingo machine. The gaming device 100 may alternatively comprise a live table game of chance, such as a blackjack table or roulette table, where the functions described herein carried out by the gaming device are carried out by a table attendant.

If gaming device 100 is not a live table game, then gaming device 100 further provides a game 116 configured for play by a player. Gaming device 100 would then include typical hardware and software components (not shown), such as a processor, memory, and input/output devices such as a video output and control inputs, and game software, for executing game 116. According to play of the game 116, one or more game results may provide the player with an "award credit". The game results may be provided by a game of chance involving random events or may be provided from a predetermined outcome selected from a fixed pool (e.g., a lottery).

Award credits, unlike game credits which are used for playing the game 100, may be directly redeemed for prizes or awards on prize station 112. Award credits may also be used in a meta-game. Although in the preferred embodiment award credits are not used for additional game play, the present invention fully encompasses embodiments which do provide for award credits being used to add to game play credits.

A meta-game is defined as using credits, award credits, promotional credits (defined below), or any other transferable result(s) from one or more individual games comprising a plurality of individual game units, towards a game that requires, in order to play, the output results (in terms of credits, award credits, promotional credits, special indicia, etc.) of previously played game or games, and where the meta-game is a different game than any of the games from which output results are being used.

In the simplest case (other than straight prize redemption using award credits) the award credits may comprise meta-game pieces which are collected by the player for use at prize station 112. In this example, the meta-game pieces may be part of a game board or puzzle and when the player has collected a particular subset (i.e., collection or accumulation) of meta-game pieces, the player uses those pieces to "play" prize station 112, where the combination of award credits will entitle the player to a particular prize or class of prizes. In other cases the award credits may entitle the player entry into a more complex meta-game, where the award credits are used in the meta-game in a similar way that currency is used in primary games.

Figure 2:
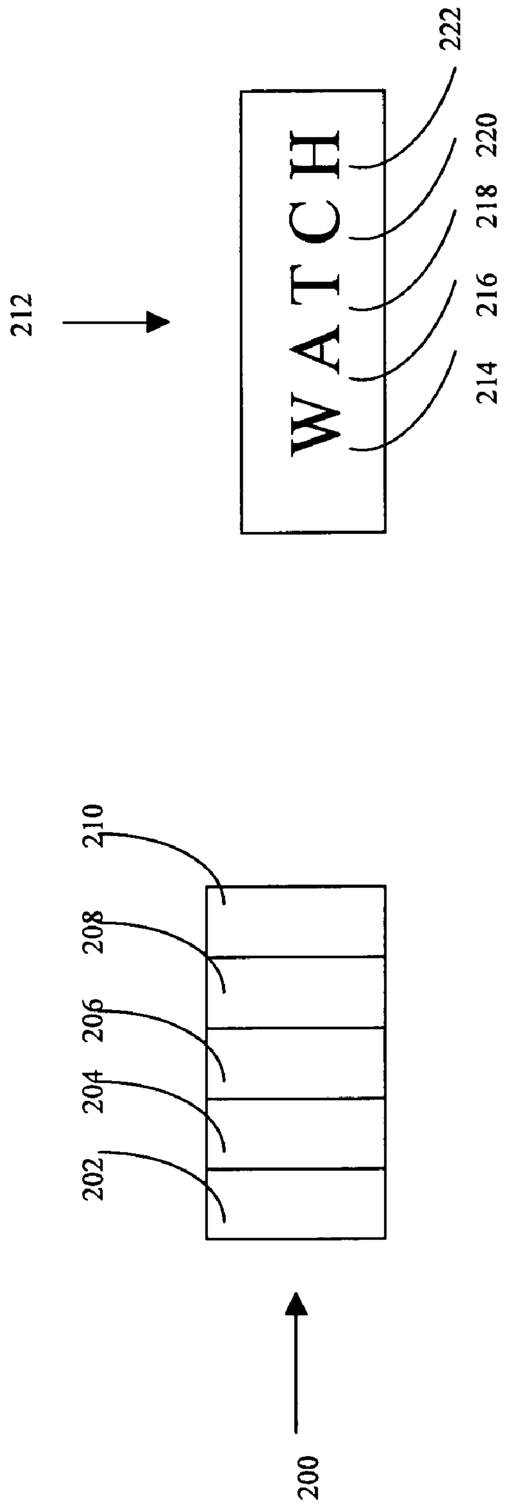
FIG. 2 is a functional block diagram of an example game board suitable for use with the present invention.

FIG. 2 illustrates a sample game board 200 having spaces for game pieces 202, 204, 206, 208 and 210. The game pieces 202 through 210 may be represented by indicia or representation to a particular theme, such as a popular board game, television show, movie, etc. Game rules may require accumulation of all or part of the game pieces 202 through 210 for different levels of prize awards.

FIG. 2 also illustrations a second sample game board 212 having letter space holders to accommodate letters 214, 216, 218, 220 and 222 corresponding to the word "WATCH". This game allows a player to collect letters (game pieces) from the word "WATCH" during game play of the primary game, normally a slot game. Once the player has collected all the letters, the player may redeem a prize corresponding to "WATCH" from the prize station. Numerous other game board formats and rules suitable for use with the present invention will be readily apparent to one of ordinary skill in the art and with the benefit of the present disclosure.

Referring back to FIG. 1, according to one aspect of the invention the gaming device 100 is configured to maintain a record of the accumulated award credits (game pieces) associated with the player, including award credits earned during play of the game 116. The player may maintain the player's state of award credits earnings (e.g., award credit game state, or award credit state) even when the player has terminated play of the gaming device 100. In one embodiment, the player's game state is maintained via a prize bearing instrument (PBI) 104. PBI 104 may comprise any media suitable for associating a player's award credits with the player. Example media include a printed ticket (voucher), a magnetic or smart card, or other information storage medium. As an interface to PBI 104, gaming device 100 provides a PBI reader/writer device (not shown) capable of reading PBI 104 and writing to (or generating) a PBI. PBI 104 will typically contain one or more data records indicating the number of (or collection of) award credits earned by the player. For vouchers, gaming device 100 will include a voucher reader and a voucher printer that is in operable communication with gaming device 100. When the player selects to terminate play, gaming device 100 prints a voucher indicating the number of award credits earned by the player.

Gaming device 100 is also configured to determine the accumulated award credits previously earned by the player, generally by reading PBI 104 as presented by the player and identifying any award credits indicated. The previous award credits may have been earned from the same gaming device 100 or a similar gaming device having the same underlying feature set of gaming device 100.

The award credits previously earned as identified by gaming device 100 are accumulated with further award credits which the player may earn during current play of gaming device 100. The accumulated award credits may be maintained by the player at the termination of play of the gaming device 100 via another PBI 104 which indicates the overall accumulated award credits earned. PBI 104 thus preserves the "award credit game state" or "game state" of the player in terms of award credits upon termination of play on the gaming device. The player may later resume play of the gaming device 100 at the preserved game state by presenting PBI 104 to game device 100 as described above.

In the example "WATCH" game 212 of FIG. 2, the player retains the player's earned letters (investment) so that when the player later continues play either on the same or different game, the player's letters (investment) is retained and restored and the player resumes play from the preserved game state. Although described herein for the purposes of redeeming tangible prizes and service, it will be readily apparent to those skilled in the art that the present invention is suitable for use with preserving game states (e.g., award credits, game pieces) for use with bonus games, progressive games, investment bonus games, among others.

Continuing with FIG. 1, prize station 112 contains one or more prizes 110. The prizes may be tangible goods (e.g., diamonds, keys to a car, event tickets), services, or monetary awards. Although not required for operation of the invention, the prizes are not generally redeemable directly via cash payments by the player to the prize station or the game devices. Rather the prizes are normally redeemable via award credits earned by the player from playing gaming device 100. The redemption process indicated by double-headed arrow 108 is manually initiated by a player, as is the playing process indicated by double-headed arrow 102. Both paths make use of PBI 104. Redemption path 108 is executed by presenting one or more PBIs to prize station 112. Prize station 112 is equipped with a PBI reader/writer device (not shown) for reading PBI 104 and determining the award credits associated with the player from data provided by PBI 104. The prize station then determines the prizes to which the player is entitled according to the award credits earned by the player. For example, prizes may be selected according to the number of award credits earned (e.g., using a hierarchical prize level arrangement) or according to the collection of types of award credits earned (e.g., game pieces on a game board or puzzle) or both. Other prize payout arrangements may also be used.

After the player's selection, the selected prize is awarded to the player. According to one embodiment of the invention, the prizes are maintained in vaults having doors secured by latches and windows to thereby allow the player to see the prizes inside the vaults and yet provided a level of security by limiting access to the prize. A button actuator receives the player's selection. In response, the latch is released allowing the player to open the door and retrieve the prize. In another embodiment of the invention, an attendant provides the prize to the player in response to the player's selection. Security measures may also be implemented including verification of the PBI via a validation server, which verifies transactions indicated by the PBI against records in a database (not shown). Additionally, if an attendant tenders the prize, the attendant may be required to present a code or electronic key identifying the attendant. This identifying information may then be verified against a validation server to determine whether the attendant has sufficient authority to tender prizes to players.

In another embodiment of the present invention, the prize station 112 comprises a conventional computer having a display monitor to present the prizes. In this embodiment, a web site may be used to provide an interface to which the player redeems award credits. In yet another embodiment of the invention, prize delivery may be made using a conventional courier services or mail service.

Figure 3:
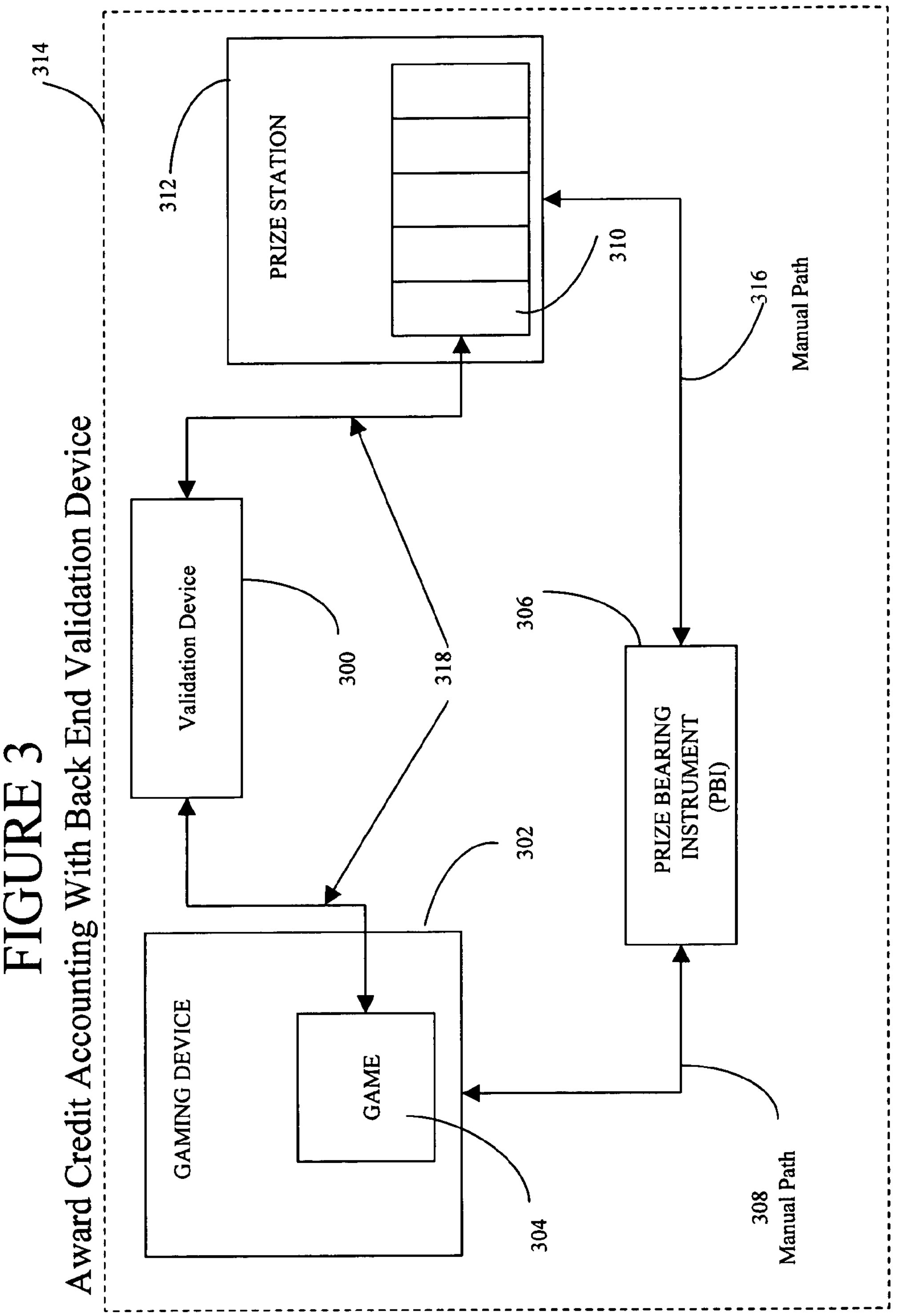
FIG. 3 is a functional block diagram of another example system for maintaining award game states in accordance with the present invention.

Referring now to FIG. 3, another embodiment of a system for maintaining a player's award game state in accordance with the present invention is shown. System 314, like system 114 described above in conjunction with FIG. 1, comprises a gaming device 302 for playing a game 304 and a prize station 312 comprising one or more prizes 310. System 314 further comprises a validation device 300 which typically comprises a server computer configured with conventional hardware and software components (not shown). Validation device 300 is operatively coupled for communication with gaming device 302 and prize station 312, normally via a network connection, shown as connections 318.

Validation device 300 may function in one of a number of ways. According to one aspect of the present invention, validation device 300 may serve to validate award credits which are earned and collected by the player on gaming device 302 and redeemed for prizes at prize station 312. Various validation means known in the art may be used to carry this out, including maintaining transaction records on validation device 300 which corresponds to transaction records identified on the player's PBI 306.

According to another aspect of the invention, the use of validation device 300 eliminates (or reduces) the need for recording the actual award credits onto PBI 306. Rather, validation device 300 may serve to maintain the award credits associated with players in a database (not shown). Under this arrangement, the player is identified with a record in the database, which further identifies the award credits earned by the player. The player may use any means for identifying herself to gaming device 302 or prize station 312, including using a personal identification number (PIN) or using an identity PBI 306, which instead of bearing the award credits earned by the player provides a unique identifying information to identify the player's corresponding game state (e.g., award credits or game pieces) information. The use of PBI 306 is indicated by double-headed arrows 308 and 316; both show a manual path of use by the bearer of the PBI. In each case the bearer of PBI 306 would insert it into a PBI reader at the target location.

Figure 4:
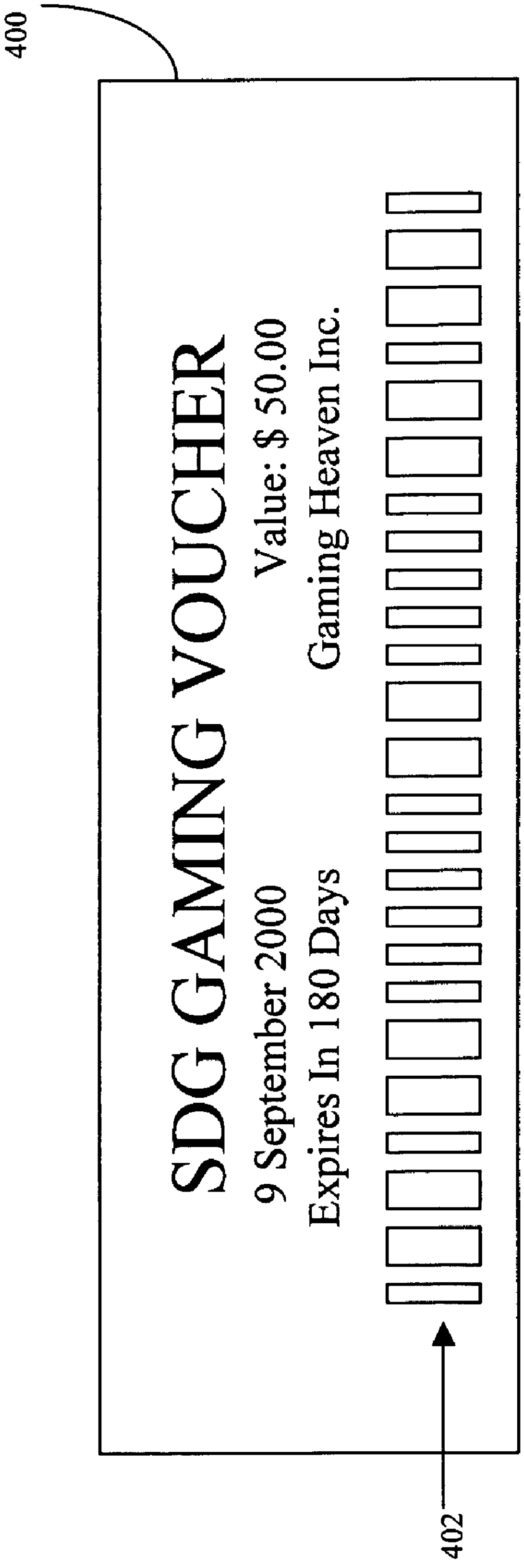
FIG. 4 depicts a sample voucher ticket suitable for use with the present invention.

FIG. 4 depicts an example ticket voucher 400. Ticket voucher 400 includes a data record in the form of a UPC bar code 402. As described above in conjunction with FIG. 3, this data record may identify the player's award credits or may alternatively identify the player's corresponding record in the validation unit's database.

Figure 5:
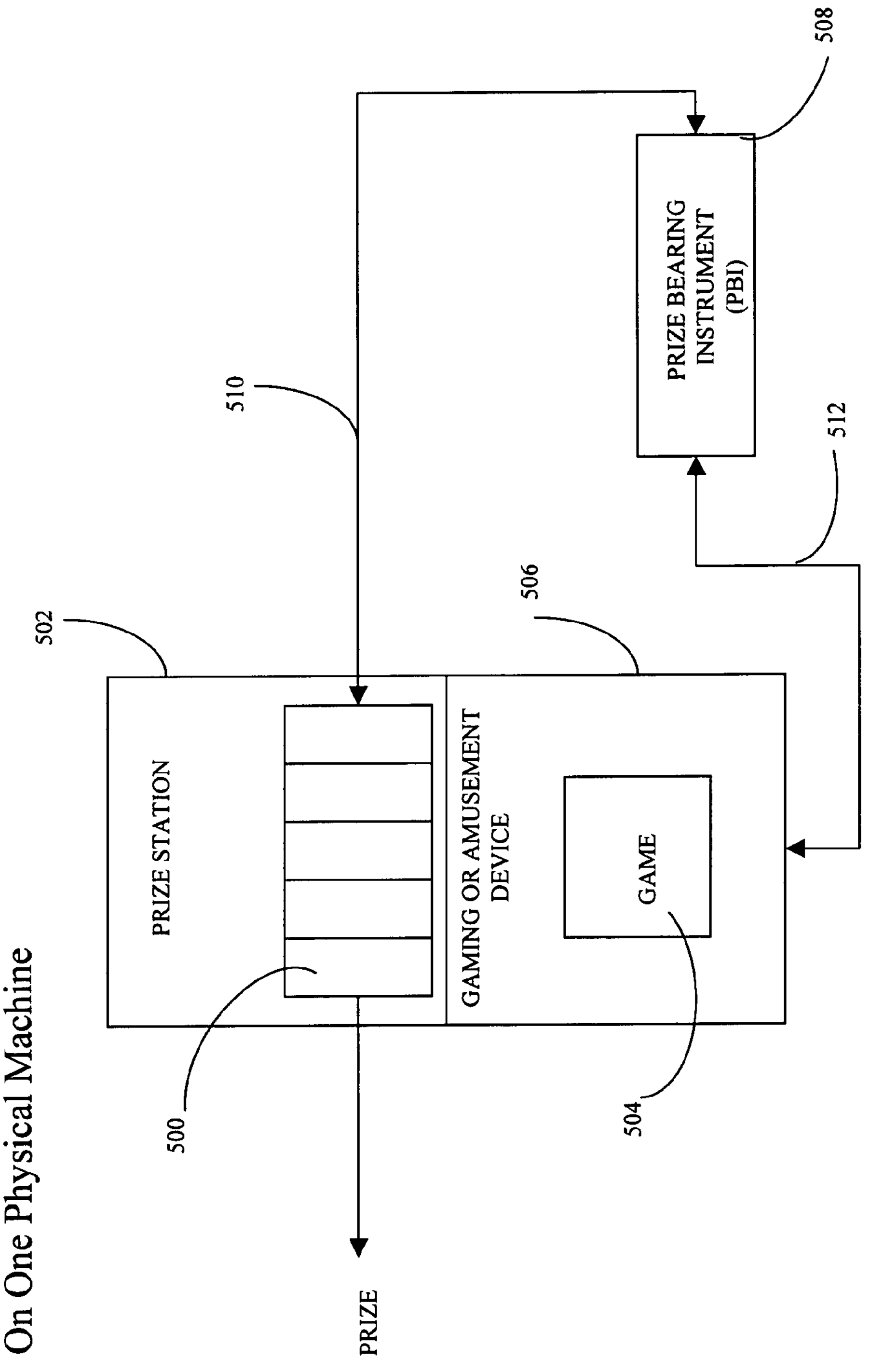
FIG. 5 is a functional block diagram of another example system for maintaining award game states in accordance with the present invention.

FIG. 5 illustrates another example embodiment of a system for maintaining a player's game state in accordance with the present invention. The system has a gaming device 506 suitable for playing a game 504 and a prize station 502 having one or more prizes 500. Gaming device 506 and prize station 502 are integrated into a single unit.

Gaming device 506 and prize station 502 may further be operatively coupled for communication to allow prize redemption to be made by the player via the gaming device. In this embodiment, the gaming device may include a monitor or other display device (not shown) for displaying game play as well as prize selection on a single display unit. The gaming device may further be coupled to or configured to be coupled to a network for connection to the global information network (Internet). Under this arrangement, a web-based scheme may be use to provide prize selection and to select delivery method directly on the gaming device. In this environment, the player's award credits may be used for shopping online. For example, a prize selection may allow a player to purchase a predetermined amount of goods or services from pre-selected online merchants. PBI 508 may also be used as described above in FIG. 1 and FIG. 3. Path 512 shows manual use of PBI 508 with the player inserting/withdrawing PBI 508 from gaming device 506. Path 510 may be either a manual path, where the player inserts PBI 508 into a reader associated with prize station 502, or may include an electronic connection between gaming device 506 and prize station 502, where PBI 508 may be issued after completing a transaction at both gaming device 506 and prize station 502.

Figure 6:
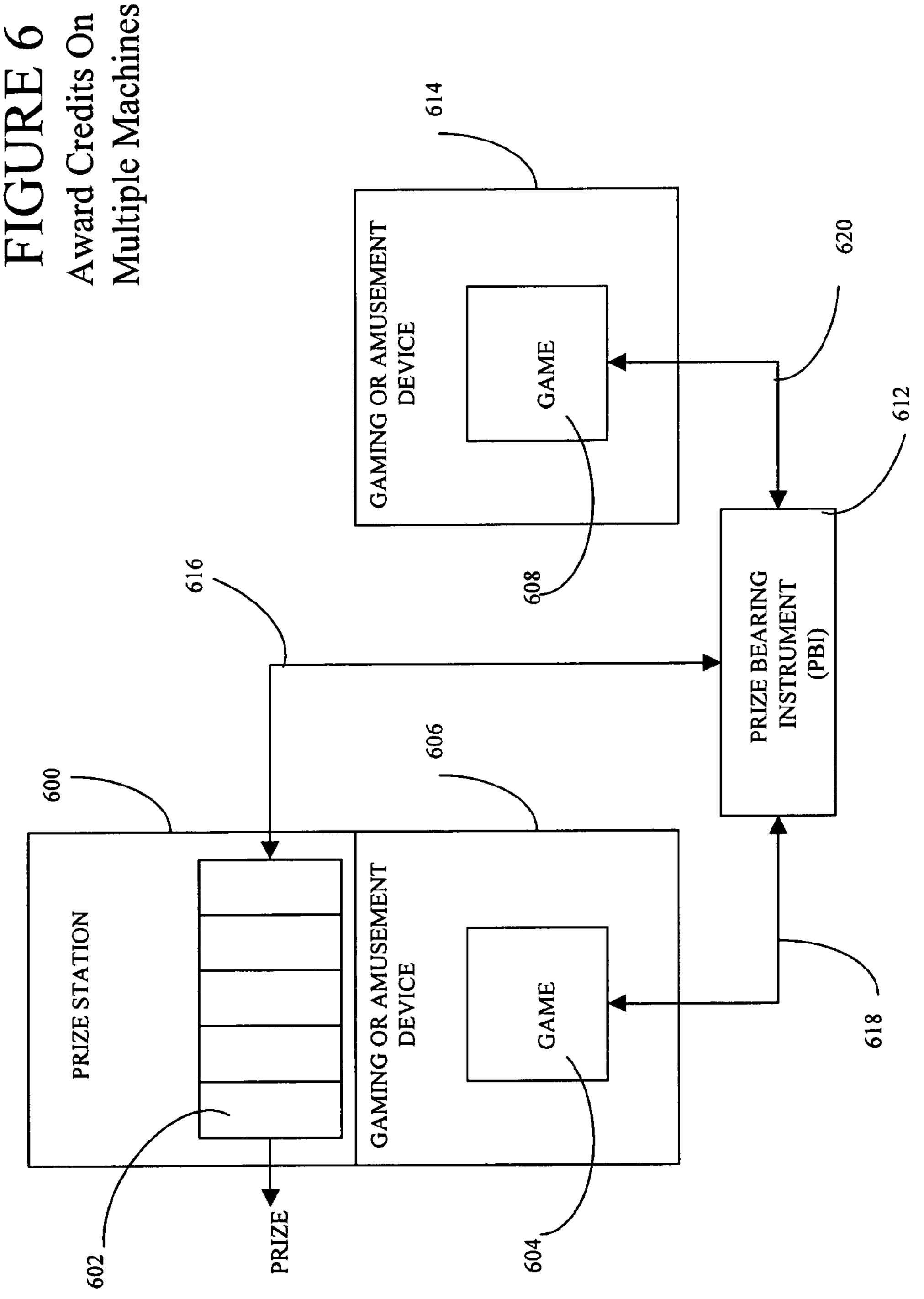
FIG. 6 is a functional block diagram of another example system for maintaining award game states in accordance with the present invention.

Referring next to FIG. 6, shown is another example embodiment of the present invention for maintaining a player's award game state. There is a game device 606 having a game 604 for play and another game device 614 having a game 608 for play. The game device 606 is integrated with a prize station 600 as described above in conjunction with FIG. 5.

The award credits earned by a player on game device 606 may be maintained and later presented and accumulated with additional award credits on game device 606 or game device 614, normally via PBI 612, although as noted above a validation unit may be used to perform this game state maintenance function on the "back-end". Likewise, award credits earned by a player on game device 606 may be maintained via PBI 612 for presentation and accumulation of further award credits on game device 614 or game device 606. PBI 612 may be presented to the prize station 600 for prizes shown generally as 602. Paths 616, 618, and 620 show the different uses to which PBI 612 may be used in this embodiment. Paths 618 and 620 are award credit creation/gathering by manually using (or receiving) PBI 612 from gaming devices 606 and/or 614. Path 616 indicates the manual use or retrieval of PBI 612 after using prize station 600.

Figure 7:
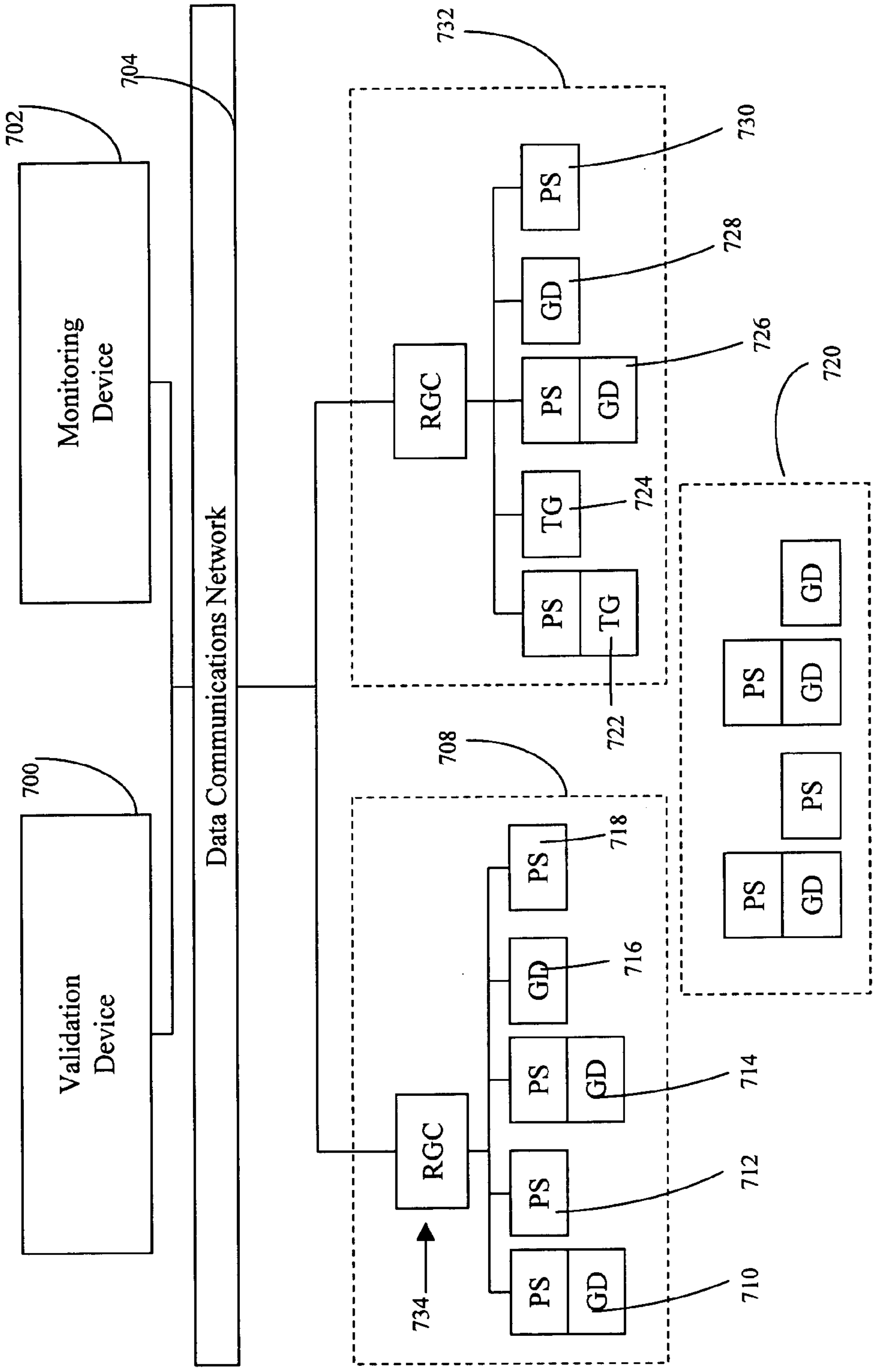
FIG. 7 is a functional block diagram of another example system for maintaining award game states in accordance with the present invention

Turning now to FIG. 7, there is shown another example award state maintenance system which comprises a plurality of individual systems grouped as 708, 720, and 732. FIG. 7 illustrates that a wide variety of systems and subsystems may be utilized with the present invention. Subsystems include those that are both connected and unconnected.

Systems 708 and 732 are each operatively coupled for communication to a validation device 700 and a monitoring device 702 via a data communications network 704. System 708 comprises a plurality of game devices and prize stations each coupled to a conventional remote game controller (RGC) 734. RGC 734 is coupled to communication network 704 for communication with the validation and monitoring units. System 708 includes individual game device 716 and prize stations 712 and 718. System 708 further includes integrated game devices and prize stations 710 and 714. Award credits earned in any of the gaming devices may be maintained according to the present invention, including a PBI, validation unit 700, or via a combination of the PBI and the validation unit 700 as described above. The present invention encompasses configurations that allow system 708 to issue award credits that may or may not be used on system 732 or on system 720; any subsystem may be configured to accept or reject award credits from other subsystems, depending on the needs of the particular installation.

System 732, like system 708, comprises a plurality of game devices and prize stations each coupled to an RGC, which is coupled to communication network 704. The game devices of system 732 include table games (TG) 722 and 724 as well as conventional gaming devices 726 (with integrated prize station) and 728 and a non-integrated prize station 730. Table games 722 and 724 are maintained by an attendant or dealer for the particular table game (e.g., blackjack, roulette). Each table game is also equipped with a PBI reader/writer (not shown) to enable a player of the table game to present her PBI and establish the player's existing or previously earned award credits. Certain game results (such as consecutive blackjacks) may result in further award credits to be earned by the player during play of the table game. At the completion of play the PBI reader/writer may be activated to generate a PBI to give to the player after play is completed. As noted above, the award credits may alternatively be managed by validation device 700 in conjunction with individual PBIs, or without the need for a PBI where a player has a PIN number to identify the player. Table game 722 differs from table game 724 in that table game 722 further has in combination a prize station, where a player may redeem award credits for prizes.

System 720 also comprises a plurality of gaming devices and prize stations, but unlike systems 708 and 732 this system is not coupled to communication network 704. Each gaming device will use PBIs rather than validation device 700 and monitoring device 702. As discussed earlier, the overall system may be configured to allow or disallow PBIs generated from subsystem 708 or 732 to be used in the machines comprising subsystem 720 and vice versa.

Figure 8:
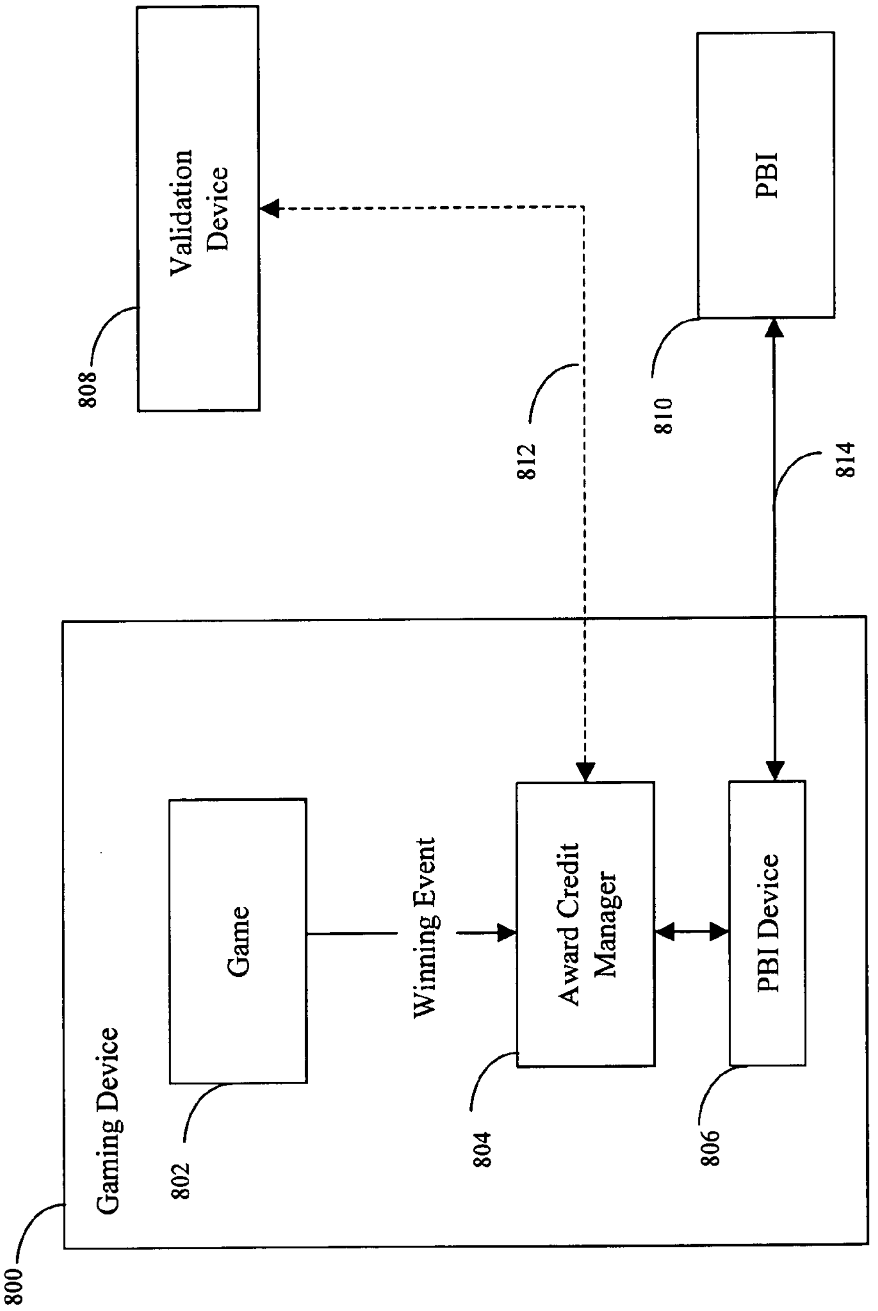
FIG. 8 is functional block diagram showing an example gaming device suitable for use with the present invention.

Referring now to FIG. 8, a gaming device is shown in additional detail. Gaming device 800 comprises a game 802 (skill, arcade, chance, semi-skill, fixed-pool) operatively coupled with savable game state manager 804, which is also operatively coupled with a PBI input/output device 806. The PBI input/output device 806 is configured to read, write, generate, transmit, and receive information about PBI 810 as needed. Path 814 shows a manual usage path for PBI 810; the player must manually insert the PBI into the PBI reader. If PBI 810 comprises a printed ticket (voucher), the PBI input/output device 806 comprises a voucher reader for reading vouchers and indicia printed thereon, such as "Interleaved 2 of 5" bar codes. The PBI input/output device 806 would further include a voucher printer for generating vouchers when the player terminates play on gaming device 800.

Savable game state manager 804 carries out the operation of managing a player's savable game states during play. If a player presents a PBI 810 prior to playing, the previously earned savable game states are identified from PBI 810 and/or from validation device 808 which communicates with the gaming device 800 over an electronic communications path 812. While playing game 802, the player may earn additional credits or change savable state based on winning game events. These events are noted by savable game state manager 804 in conjunction with the previously earned savable game states, if any. Upon termination of play of the gaming device by the player, another PBI 810 may be issued to the player which contains data associating the cumulative award credits or other game state earned by the player.

Figure 9:
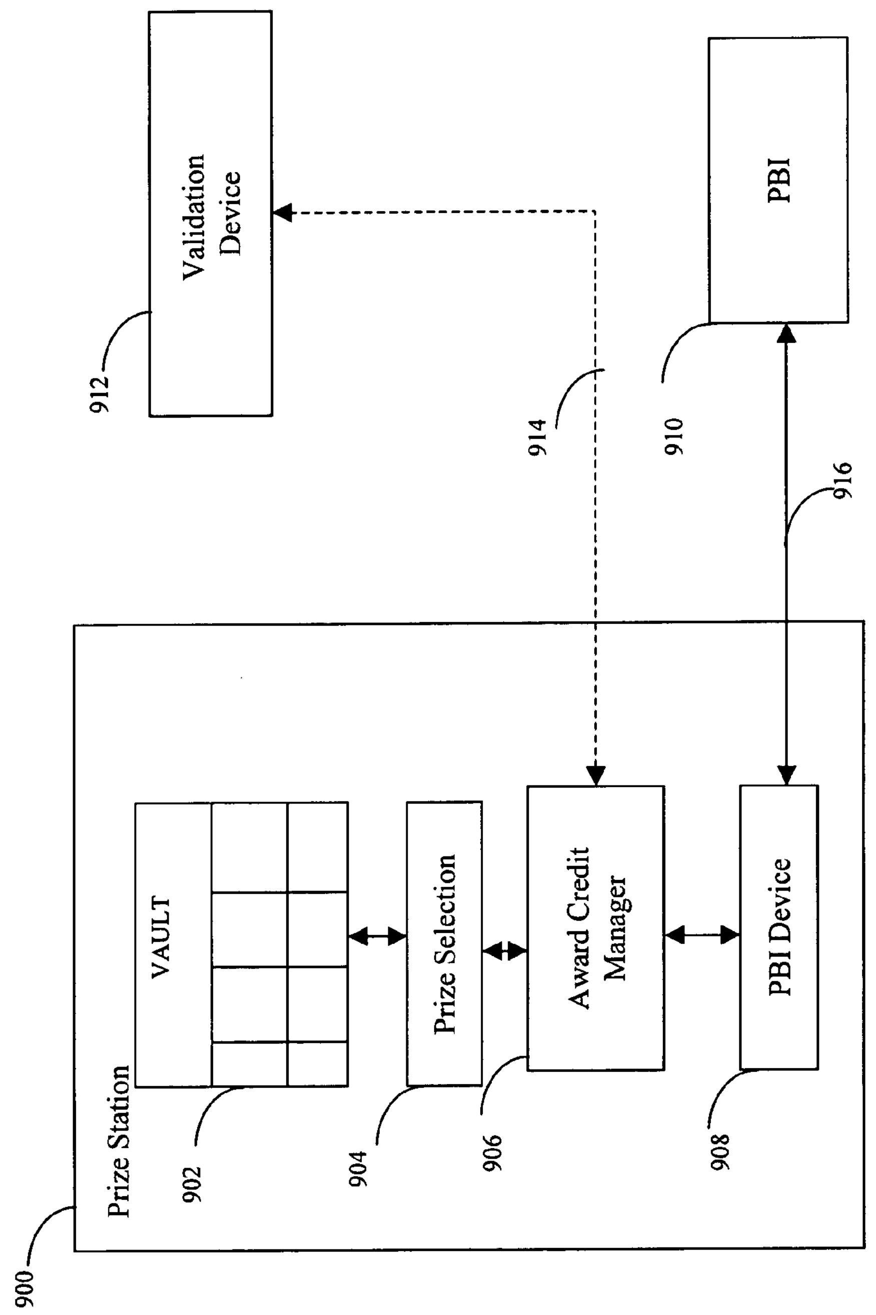
FIG. 9 is a functional block diagram showing an example prize station suitable for use with the present invention.

FIG. 9 shows a prize station in more detail. Prize station 900 comprises a PBI input/output device 908 operatively coupled to an award credit manager 906, a prize selection module 904 coupled to the award credit manager 906, and a plurality of prizes maintained in vault 902, the vault operatively coupled for communication with the prize selection module 904.

When a player presents one or more PBIs to prize station 900, shown as PBI 910 and manual insertion path 916, the PBI input/output device 908 reads the award credits associated with the player. Award credit manager 906 determines the total award credits' value, either directly from PBI 910 and/or from validation device 912. Validation device 912 is operably connected to prize station 900 via electronic communications path 914. Prize selection unit 904 offers to the player one or more prize selections based on the player's total award credits. The player may select a prize selection or may cancel prize redemption. If a player selects a prize, the prize is awarded from vault 902. If the prize selection does not exhaust the player's total award credits, another prize selection may be offered to the player, if the remaining credits are sufficient to support a prize selection from the vault 902. If the remaining award credits are not sufficient to support a prize selection, the remaining award credits are maintained and associated with the player, normally by dispensing another PBI 910.

Where an attendant manages a prize booth to carry out the functions of the prize station in accordance with the present invention, the player presents one or more PBIs 910 to a PBI input/output device 908 associated with the prize booth to ascertain the award credits associated with the player. The player's award credits are indicated to the attendant, normally via a conventional video display device (not shown). The attendant then notifies the player of the prizes (and/or prize levels) to which the player is entitled according to the player's earned award credits. This can be carried out manually via a catalog (or a prize display booth) or automatically via the display device. In response, the player makes a prize selection, and the attendant either manually tenders the prize to the player or provides automatic (via vending device) or courier delivery (e.g., mail, parcel service) to the player.

Figure 10:
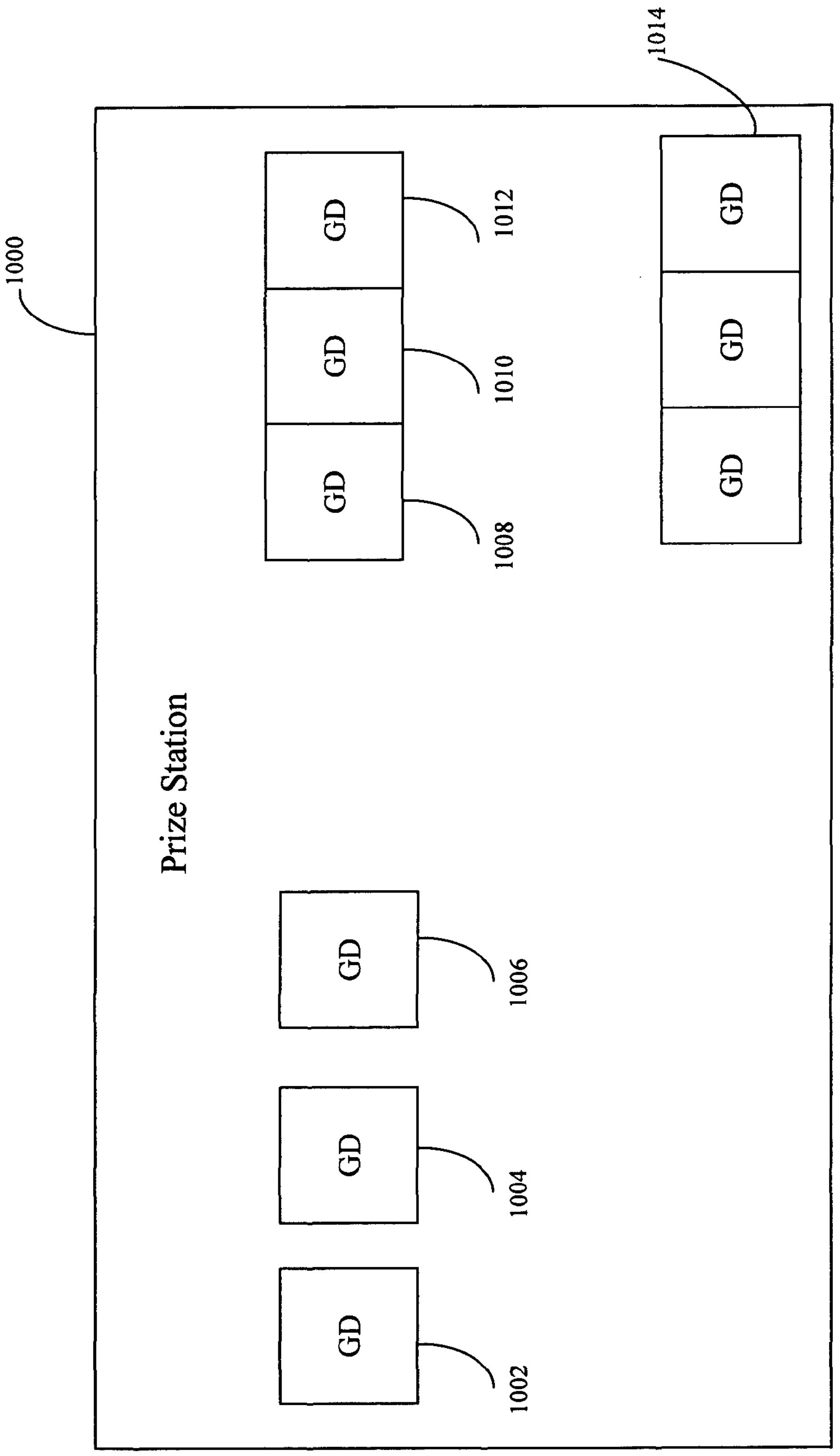
FIG. 10 is a functional block diagram depicting meta-games suitable for use with the present invention.

FIG. 10 illustrates two additional meta-game systems which may be implemented using the game state maintenance system of the present invention. FIG. 10 includes a prize station 1000 and a plurality of gaming device indicators illustrated as gaming device indicators 1002, 1004, and 1006. Each gaming device indicator corresponds to a gaming device on the game floor; there may be as many gaming device indicators as there are individual games in actual implementations or they may be grouped for convenience. Under this arrangement a particular prize awarded by the prize station 1000 may require an award credit from each of the gaming devices indicated by 1002 through 1006 or a predetermined subset, such as three award credits where at least two of three must come from different gaming devices. Various other award requirements may also be used and will readily come to mind for a person of ordinary skill in the art and with the benefit of the present disclosure.

Another example of a meta-game involves banks of gaming devices. Bank 1 is shown having individual gaming device indicators 1008, 1010, and 1012. Bank "n" is referenced generally as 1014, and is understood to further comprise individual gaming device indicators not individually labeled. There may be any number of banks between bank 1 and bank "n". Prize station 1000 may require an award credit from each bank of gaming devices (corresponding to the gaming device indicators) in order to receive a particular prize. Each bank may be configured as the same game (e.g., blackjack), the same device type (e.g., slot machine), the same family of game (e.g., games manufactured by Sierra Design Group™), or other arrangement.

Figure 11:
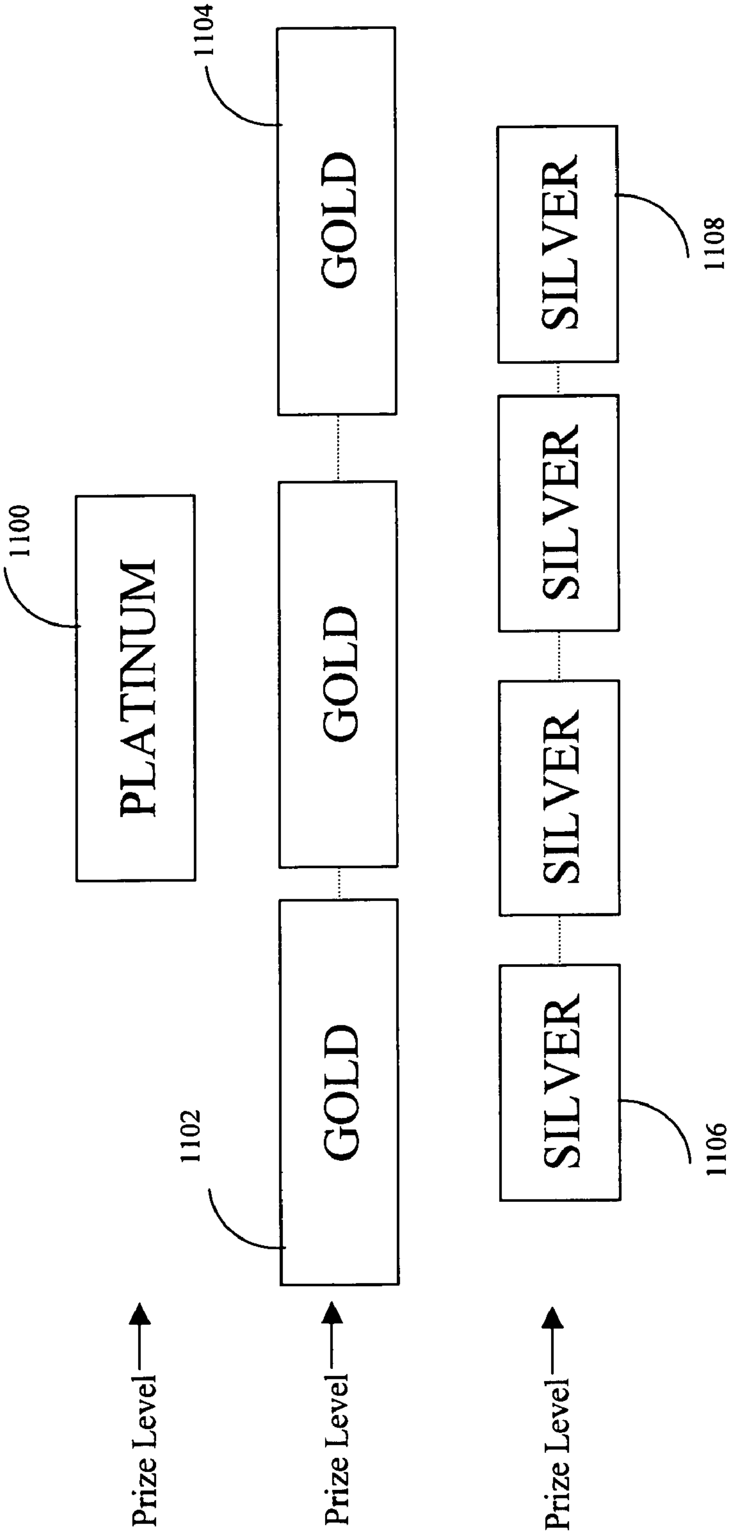
FIG. 11 is functional block diagram showing prize organization suitable for use with the present invention.

FIG. 11 illustrates a sample hierarchical prize level arrangement suitable for use with the present invention. The sample arrangement includes prize levels comprising a silver level (1106 through 1108), a gold level (1102 through 1104), and a platinum level 1100. One or more prizes may be associated with each level. For example, bracelet prizes may be available at the silver level (1106 through 1108), watches may be available at the gold level (1102 through 1104), and diamond jewelry may be available at the platinum level (1100). According to this arrangement, the gaming device may provide silver level award during play. The player may decide to redeem the silver award for one of the bracelet prizes, or the player may elect to accumulate additional silver level awards by playing the same or another gaming device.

The prize values in this example are arranged hierarchically, where two of the prizes at one layer are worth one of the prizes at the layer above. Two silvers awards may be used to redeem either two silver prizes or one gold prize. Similarly, the player may accumulate four silver awards and use them to redeem one platinum prize, two gold prizes, four silver prizes, or one gold and two silver prizes. A player retains any unused (unredeemed) credits during prize redemption. Thus, if a player has accumulated four silver awards, the player may decide to redeem a gold award (at the cost of two silver awards), and retain two remaining silver awards for later use or accumulation.

Having the ability to save award credit state creates the need and desire to save other states associated with a gaming device. A player will be particularly interested in saving the game state of a game that involves the accumulation of play points or play state, where the game state is not tied to award credits (or perhaps not yet tied in to award credits but could be).

Generally, game states other than award credit states fall into one of two categories. The first is saving credit state, that is, saving state when working towards an award or credit, where the game's state is derived from a game of chance or from a result from a fixed-pool set of results. The second is saving any other game state that effects the state of the game as it appears to a player if they leave and return later, typically a skill game where the player has reached a certain level or point value and doesn't want to have to start over.

Figure 12:
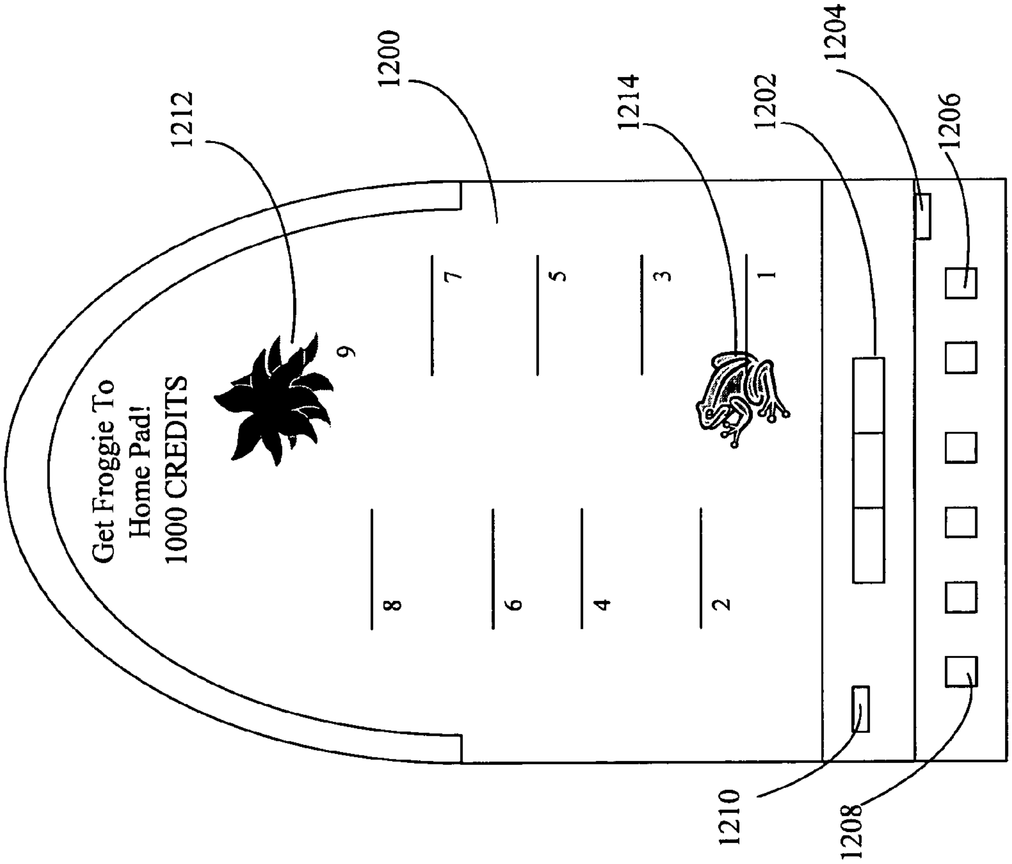
FIG. 12 is a functional block diagram depicting a game state saving game suitable for use with the present invention.

An example of the first type is shown in FIG. 12. This is a state saving game associated with games based on chance (or fixed-pools) and working towards an award state. Typically the goal, if reached, is playing credits or award credits. Gaming device 1200 has a standard primary game with indicia windows shown as 1202. The primary game may be any of the well known reel games, poker games, keno, bingo, fixed-pool games, etc. There is a panel of player buttons, shown between buttons 1206 and 1208, used for the primary game. Any layout and interface may be used, from a fixed number of physical buttons to a dynamic layout of touchscreen buttons. Also included is an output slot 1204 and an input slot 1210. Input slot 1210 accepts ID cards, ID vouchers, smart cards, game state vouchers, or any other means used to present gaming device 1200 with credits, states, or ID. If presented with ID, gaming device 1200 must be in operable communication with a back-end database (not shown), typically over a LAN (not shown). The communications means is used to retrieve data associated with the presented ID.

Voucher IDs are intended to be used by people who may be at a casino for more than a brief time, but who do not want to be entered as "players" in the casino's database (typically used by casinos for player tracking purposes and by players to be awarded player tracking points). This may include people who want to play a series of games over an evening or a week, want the convenience of having some gaming data kept on a back-end database, but do not want to give the casino their personal data. The player may chose to use a voucher ID, which is simply any media on which a unique identifier is recorded (typically an alpha-numeric sequence). This may include a card with a magnetic strip, smart card, bar-coded voucher, or any other form of readable media that can easily be carried by a person. Gaming device data, discussed below, can now be associated with the "voucher ID" rather than a traditional player's card. Typically voucher IDs would be given limited life spans, specified by the holder or establishment.

Like traditional player cards, the player using a voucher ID may be awarded "points" according to conventional methods for calculating player tracking incentives or awards. Later, the player may redeem the points by presenting his/her voucher ID at redemption sites established by the casino. Redemption sites could include, but are not limited to, restaurants, bars, hotels, or customer counters.

Returning now to FIG. 12, when playing the primary game there will be game states, indicia, or other aspects of the primary game that will trigger the secondary game. In this example, the secondary game is the "Froggie" game. Each time the secondary "Froggie" game is invoked by the primary game, frog 1214 will advance up one step. The secondary game starts at step 1 (the steps are labeled). With each invocation of the "Froggie" game, frog 1214 advances one step. After 7 invocations frog 1214 will be sitting on step 8. With one more trigger of the secondary game, the player will get the frog to its home pad 1212 (step 9) and will be awarded either 1000 game credits. Alternatively, the number of steps the frog advances on each secondary game invocation can be partially determined by the indicia shown on the primary game, allowing for more than one "hop" per invocation. When the frog reaches its home pad 1212, the game may present the player with the option of award credits instead of play credits.

The player has the option of saving the state of the game at the start of each primary game play. In this example, the state saved would be the state of the secondary game, specifically the frog's current step location. If the player plays "Froggie" enough to advance frog 1214 to step 5, the player may touch button 1206, the "save state" button, and receive a print-out in the form of a voucher from output slot 1204. Immediately after saving the game state to a voucher, the game resets itself to the base state, with frog 1214 back on step 1. The player may now leave the game for a while and come back, inserting the previously generated voucher into slot 1210. The game will set itself to the state saved, in this case placing frog 1214 on step 5. The game is now ready to be played.

Typically the game state just recovered will be available for a fixed length of time, perhaps 3 minutes. The game must be played within that allotted time or the game reverts to its start state and the game state voucher value is lost. If the player inserts the game state voucher and decides not to play the game, the voucher can always be recovered by pressing the "save state" button before the allotted time is up. Although discussed in terms of vouchers, any read/write media may be used in addition to having all the game state data stored in a back-end database, accessed by an ID card, PIN, ID voucher, etc. All such methods of saving game state are fully contemplated by the current invention.

The advantages of saving game state are increased interest in investment bonus games by the players. With the ability to save their state, players who must leave without having reached the winning secondary game state have a much higher incentive to return and continue playing.

Figure 13:
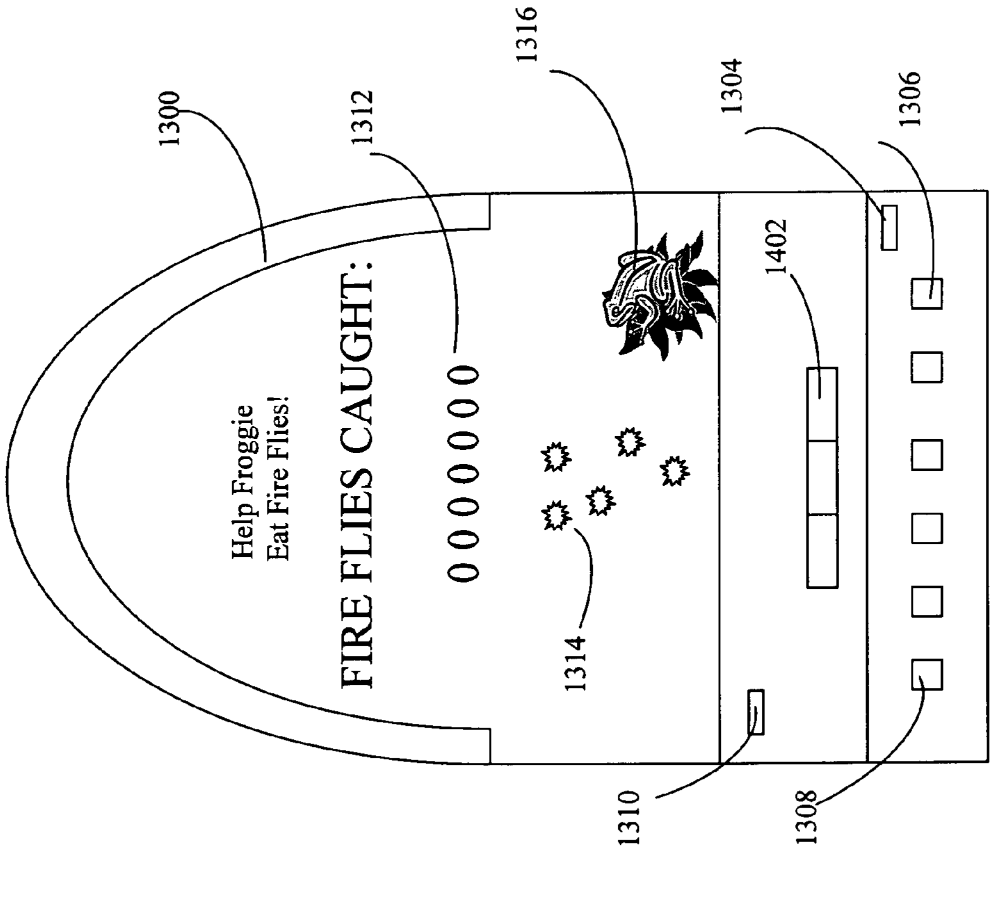
FIG. 13 is a functional block diagram depicting another game state saving game suitable for use with the present invention.

In addition to saving game state associated with awards, game state may be saved simply to keep a score on a non-award game or skill game. An example of this type of game state is shown in FIG. 13. In gaming device 1300 there is a primary game, indicated with indicia windows 1302. The primary game may be any game of chance or a fixed-pool game, including but not limited to poker, keno, reel-games, etc. Buttons shown between 1306 and 1308 are used to play the primary game in its known manner. Also included is input slot 1310 for reading any convenient input form that may be used to record game state. This includes but is not limited to vouchers, magnetic strip cards, smart cards, player IDs, ID vouchers, etc. Output slot 1304 is used to give any form of game state saving media to the player on request, typically some form of voucher or magnetic media. Button 1306 is used for secondary game play; button 1308 is a "save state" button that directs the gaming device to save the current state of the game. All this is shown for illustrative purposes only and can take a plethora of functionally equivalent forms, including configurations with just a single game.

In this case, when the secondary "Froggie" game is triggered or invoked from the primary game, the player can play the game for skill points. Frog 1316 has a tongue (not shown) that can be extended by pressing button 1306. A plurality of "fireflies" shown as 1314 are flying near frog 1316. A player presses button 1308 when a firefly is in line and near the frog's mouth, getting points thereby. The player accumulates points that are recorded on the screen at 1312.

When the player needs to leave the machine for a time, the player has the option of pressing "save state" button 1306 and saving the game state of the machine that can be saved—in this case, the players score on the secondary game. The player will be issued a bearer record from output slot 1304 on which is recorded the game state. When the player returns later, the player inserts the readable media into read slot 1310 and the game will reset to the saved state.

In a preferred embodiment, the saved game state will also have an expiration date associated with it. The idea is to encourage a player to maximize their skill point score within a specified period of time (thereby encourage game use in general during the same period). The expiration time picked would depend on the game type, the player's average stay, as well as other factors, but would typically be in hours or days.

The saving of game states discussed above includes award states, "partial" award states (secondary or bonus game state, before award points or prizes have been awarded) and skill game states. Also included is the fact that any game state that is allowed to be savable by a player may be saved. This determination may be made by the gaming device itself, a back-end server with a database for networked gaming devices, or by parameters set by the operators or other accountable people. The examples given above are illustrative, showing preferred embodiments. They are not exhaustive; the inventive concept disclosed herein fully encompasses any savable game states.

Game state may be saved in an instrument similar to that of award credits; bar codes on a voucher, etc. The descriptions already given above for types of prize bearing instruments (PBIs) and devices that read, write, and use them apply equally for game state instruments (GSIs). The same is also true of the system architectures described for use with PBIs—all the descriptions hold equally true for use with GSIs. Whereas the information contained on a PBI is related to prize redemption, the information on a GSIs is to save game state.

If both award credits and game state saving games are used in the same establishment or casino, the preferred embodiment is to combine the two. The amount of information that needs to be stored for both PBIs and GSIs is readily accommodated on any of the instruments described for the PBIs, and may readily be stored in the same database records with additional fields. In this preferred embodiment, a single bearer instrument would contain data for both award credit saving and game state saving, allowing users to carry a single instrument for both uses. It would look essentially the same as the example of FIG. 4, but perhaps with two bar code strips, one over the other, with the PBI and GSI information.

In addition to carrying information on saved game state for one gaming device, it is fully envisioned that the current invention will encompass the saving of game states for multiple games on a single bearer instrument. If the game state is being saved in a back-end database, this is the straightforward association of one player ID or voucher ID with multiple game state records, where the game state records include fields identifying the gaming device to which the saved state applies. For bearer instruments such as vouchers, multi-game, multi-state vouchers will be issued. These will be supported by readers that will read and understand (decode) the multi-game, multi-state instruments. And as discussed above, although vouchers are being used as an example of bearer instruments, any form of read/write media suitable for use as a bearer instrument is within the scope of the present invention.

Figure 14:
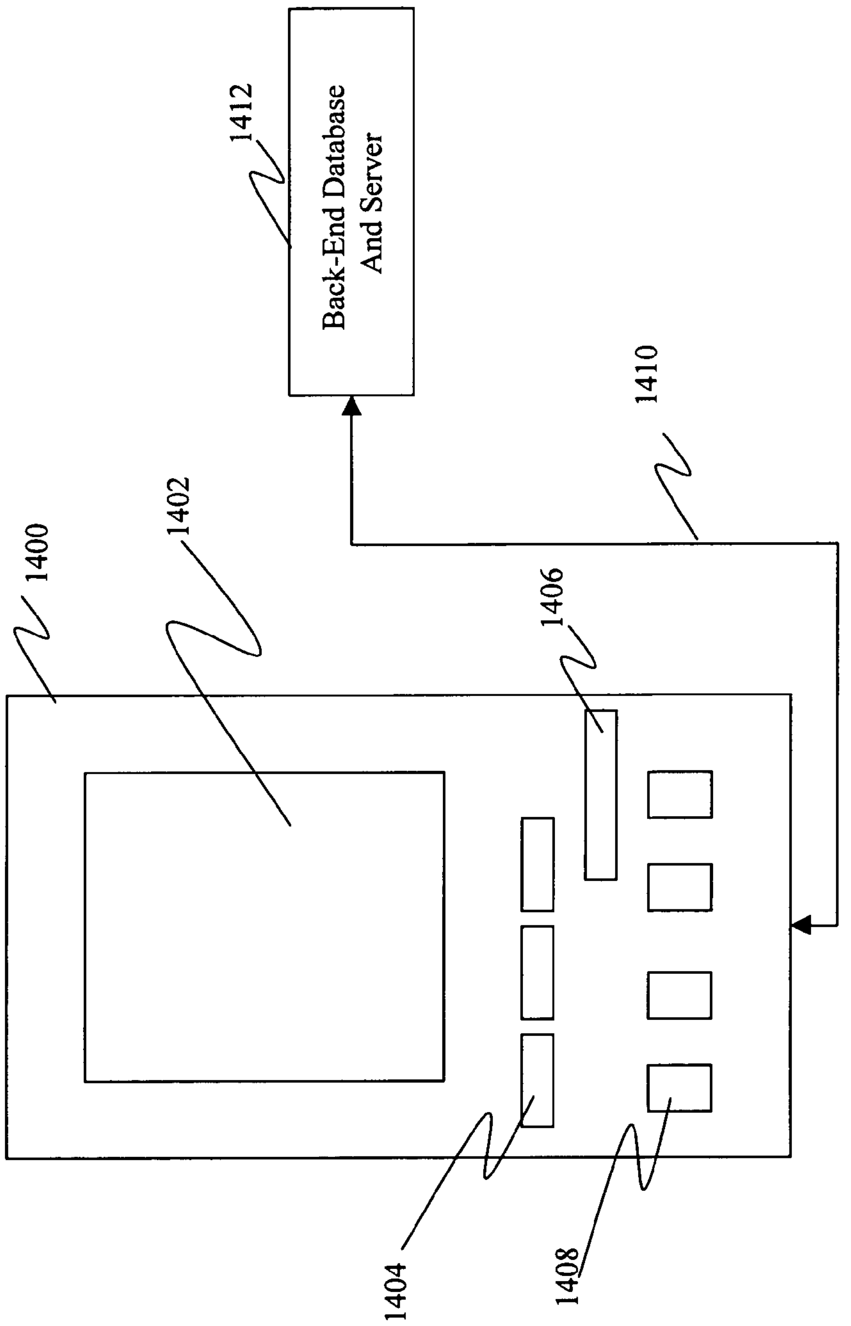
FIG. 14 is a functional block diagram of a GBI service station according to the present invention.
Figure 15:
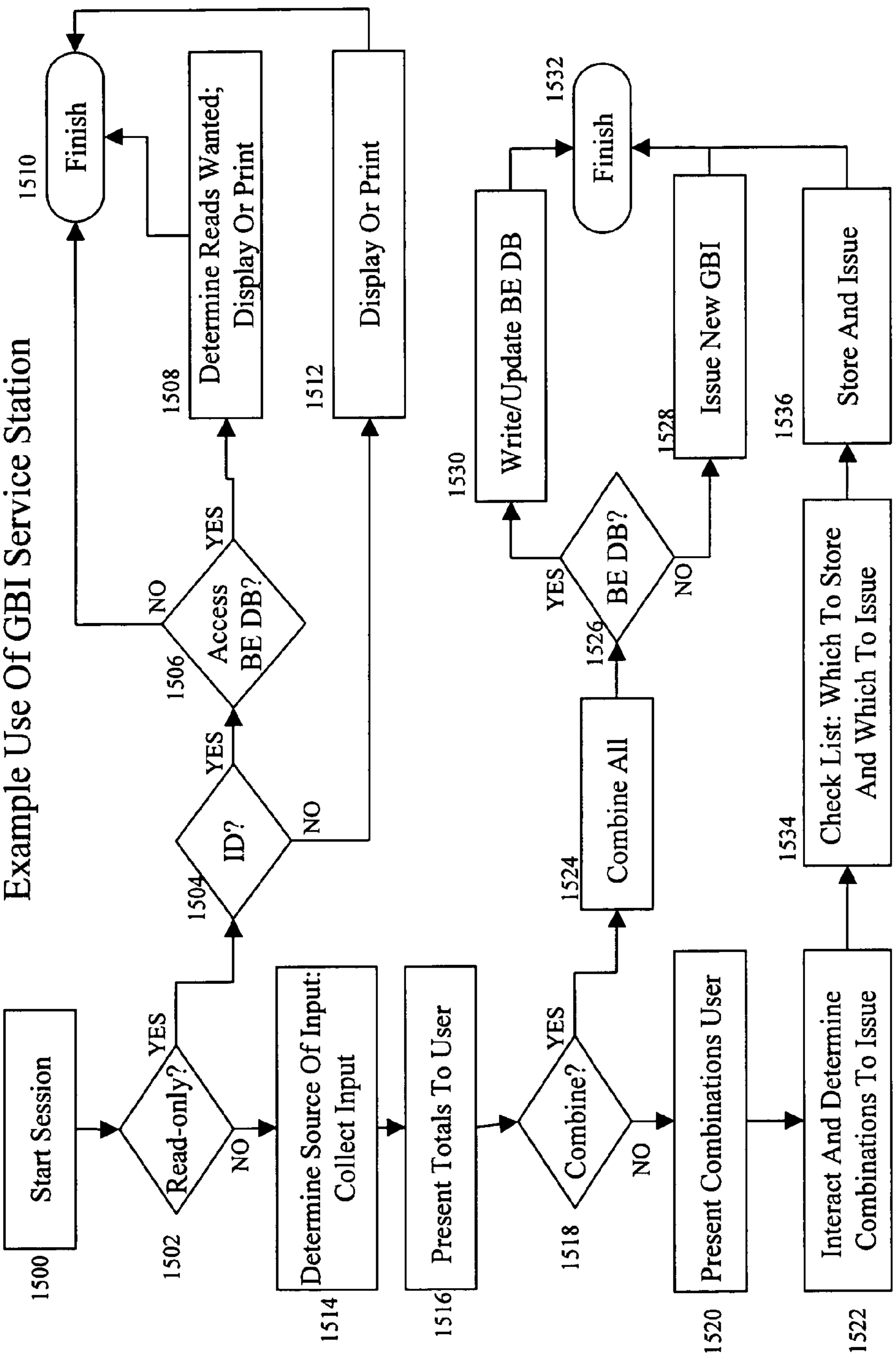
FIG. 15 is a flow diagram showing an example use of a GBI service station according to the present invention.

It is envisioned that casual players may well end up carrying multiple instruments after a while. To help them, as well as provide other related services including advertising and special promotional offers, the GBI service station will be provided. "GBI" stands for general bearer instrument, and is a combined form having PBI, GSI, or PBI and GSI information on it. FIG. 14 shows a functional block diagram of a GBI service station. Because the complexity of the interaction at the GBI service station is relatively high, a preferred embodiment will have a minimum number (if any) "hard" buttons, shown generally as buttons 1408. These hard buttons may provide a few preliminary choices, such as screen display only, print-only, and read-out only functions (read-only functions are provided for people who forget what a PBI, GSI, or GBI has on it—it provides an English, Spanish, Japanese, or other language translation of what the instrument has on it, and then returns the instrument without further processing). An implementation using hard buttons may be preferred if the GBI service station has limited capabilities; for example one that only provides reading services and nothing else.

GBI service stations will also have at least one input slot, shown as 1404, and may have more than one. A minimal configuration will have an input slot for voucher-based PBIs, GSIs, and GBIs. Optional slots may be for magnetic cards, smart cards, player's cards, and related instruments carried by people. There will also be at least one printer output port, shown as slot 1406. Also shown is a video display 1402, further being a touchscreen for user input. GBI service station will preferably be connected to the establishment's or casino's back-end database 1412 via a LAN 1410 or functionally equivalent means. Being connected to a back-end database is optional; a subset of the GBI service station's primary functions can still be carried out without the connection, and in some installations (for security or other reasons) it may be desirable to have one or more GBI service stations installed unconnected.

The functionality provided by the GBI service station is geared towards helping users manage and understand any and all instruments and/or awards or credits they may have. This will be especially helpful to occasional users who do not play enough to "memorize" the meaning of the various instruments and awards. The user starts a session by pressing a hard button for certain limited functions, or inserting any applicable instrument in its' respective slot (i.e., player's card in a player card slot, PBI in the voucher reader slot). This action corresponds to entry box 1500 in FIG. 15.

The user initially decides if they want a read-only session at decision diamond 1502. If the answer is yes, the "YES" exit is taken to decision diamond 1504. If the user has presented a form of ID to the GBI service station (rather than some form of GBI credit), the "YES" exit is taken from decision diamond 1504 to decision diamond 1506. If the GBI service station can access a back-end database and the ID is recognized, the "YES" exit is taken to box 1508. Action in box 1508 includes asking if the user wants a display or a print-out, and then providing the user with the current state of any credits in the back-end database associated with the ID presented. Box 1508 is then left and the process finishes at finish 1510.

If, at decision diamond 1506, the ID was not recognized the process finishes immediately at finish point 1510 (with a polite message to that effect on the screen, of course!). If, at decision diamond 1504, the user presented something other than an ID the "NO" exit is taken and box 1512 entered. Action taken in box 1512 is to ask if the user wants the information in hardcopy or video form, present the information to the user in that manner, return the instrument to the user, and proceed to finish the transaction at finish 1510.

If, at decision diamond 1502 the answer was "NO", the user wants to do something more than have something read. The "NO" exit is taken to box 1514. Action taken in box 1514 is to determine from the user where to get input, and then to present all information to the user in total. There are basically two places from which data can be gathered. One is from instruments carried by the user and the other is from a back-end database. If the user requests information from a back-end database, the user is asked for ID. The ID can take any form, from a voucher ID to a player's card to a PIN. The user is then asked to submit instruments until they have no more (i.e., PBIs, GSIs, and/or GBIs). Once the user indicates to the GBI service station all sources of credits has been accumulated, the GBI service station combines like data and reaches a total. Combining like data consists of combining award credits, consolidating game state information for the same gaming device, etc. Much, if not most, of the data will not be able to be combined, it will simply be listed in order. An example of hard to combine data will be GSI data. On the other hand, award credits will always combine. Box 1514 is left and box 1516 entered.

The action in box 1516 is to present the information to the user in the most coherent manner possible. As before, the user may choose hardcopy or video output. Box 1516 is then left for decision diamond 1518.

In decision diamond 1518 the user is asked if they want to combine credits that are combinable, and re-issue the rest in as compact a form as possible. If the answer is yes, the "YES" exit is taken to box 1524. The action taken in box 1524 is to do the combinations possible, remove redundant or expired credits, etc. These calculations may be done in the GBI service station or in a back-end server in a networked environment. Box 1524 is then left for decision diamond 1526.

At decision diamond 1526 the user is asked if they want to store the information on a back-end database or if they want the credits re-issued to them in an instrument form, typically GBI vouchers. If the answer is yes to the back-end database storage, the "YES" exit is taken and box 1530 entered. Please note that if the GBI service station in use is not networked, clearly the "NO" exit is taken from this decision diamond.

In box 1530, the back-end database determines if the current user has an ID. If they do, the data is recorded in records associated with that ID. If not, the user is issued a voucher ID or equivalent and the data is then stored on the database using the newly issued ID. The process finishes by then entering finish 1532.

If the user indicated no at decision diamond 1526, then the "NO" exit is taken to box 1528. The action taken is to issue a new GBI to the user that incorporates all the valid credits listed for the user, included any combined credits. The process then finishes by leaving box 1528 and entered finish 1532.

If, at decision point 1518 the user answered no, the "NO" exit is taken to box 1520. Action taken in box 1520 is instruct the user on possible combinations. For example, a user may want a separate GSI game state vouchers (to give to a friend to use), or may want to divide up any award credits into even amounts on several different vouchers to distribute to friends. Any combination of vouchers may be created for the user. Box 1520 is left and box 1522 is entered.

Action in box 1522 is to put up interactive screens and determine the combination of vouchers the user wants the GBI service station to produce. After determining a set of vouchers equal in value to the credits and vouchers presented to the GBI service station at the start of the session, box 1522 is left and box 1534 entered.

The action in box 1534 is to present a list to the user of the newly combined credits and/or game states, and ask which are to be stored in a back-end database and which are to be issued as newly generated GBIs. The user indicates which are to be stored and which are to be issued in a GBI form. Box 1534 is left and box 1536 entered. The action taken in box 1536 is to store and/or issue the GBIs the user requested. As with box 1530, if the user currently has no ID for the database and requested some of the newly recombined credits or game states be stored on a back-end database, a voucher ID or equivalent will be given to the user at this time. The process now exits box 1536 and finishes by entering finish 1532.

Figure 16:
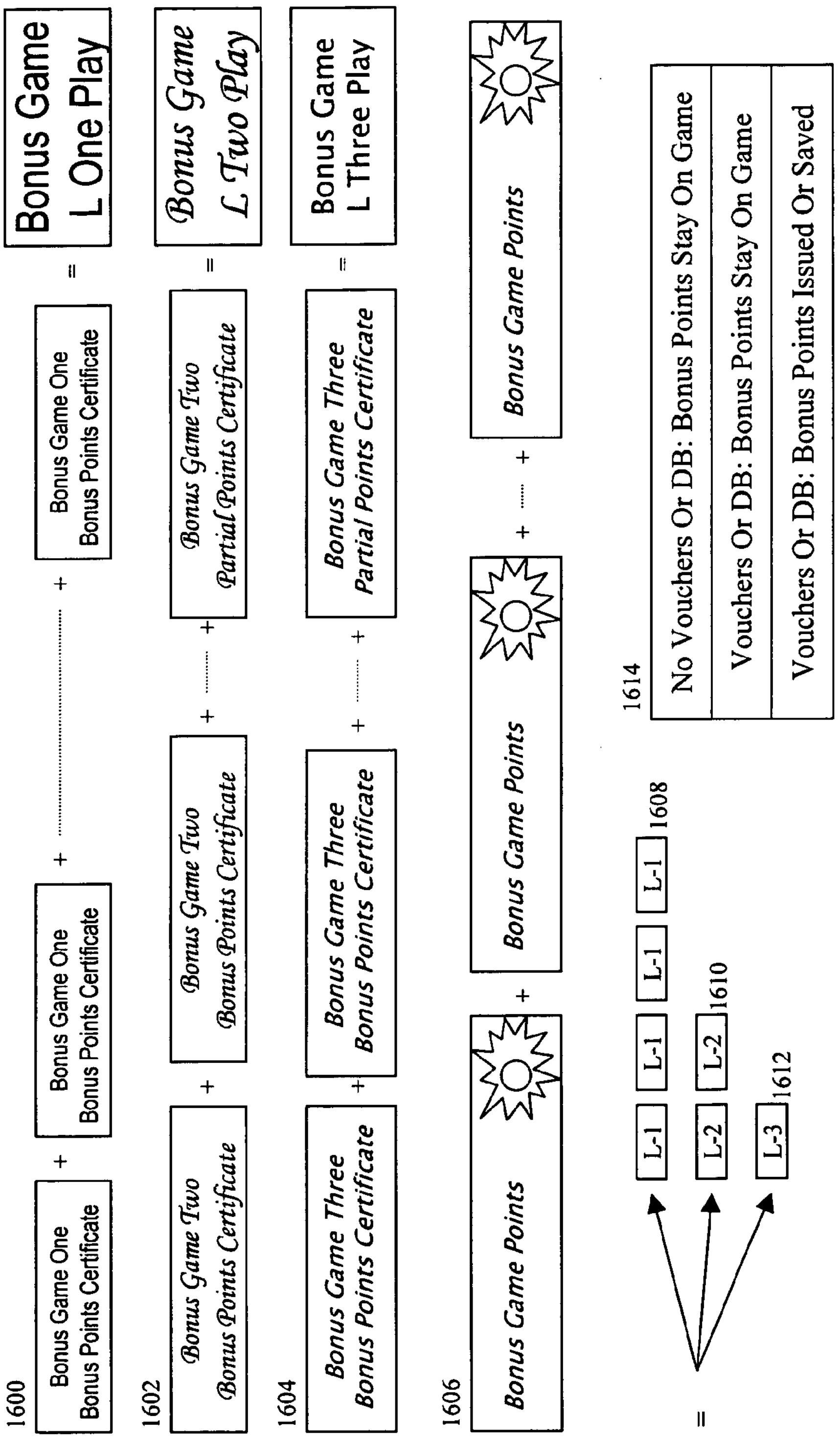
FIG. 16 is an illustration of bonus game point certificates as they relate to bonus games according to the present invention.

FIG. 16 illustrates the use of a bonus game points (a.k.a. bonus). A player must collect a specified number of bonus points to invoke or play a bonus game. Specifically illustrated are bonus point certificates, which are vouchers having player readable indicia on them indicating a value, applicable bonus games or game levels, and in one preferred embodiment an expiration date. Bonus games or levels are indicated in the final column as "L One", "L Two", or "L Three". "L" means level or category (grouping) of bonus games. This aspect may not be explicitly applicable to all casinos, and is intended for use in casinos having either multiple levels of bonus play or bonus games available, or, designated groups of bonus games or bonus plays having similar value but which the casino wants to keep separate. If a casino uses no explicitly defined bonus levels (with corresponding bonus points), it is defined as having one default bonus level. Thus, all implementations of the present invention will have one or more bonus levels in use.

Finally, the present invention can support both groupings in the same casino; that is, a set of bonus levels and within levels, game groups. Bonus levels correspond, approximately, to maximum possible payouts while groupings correspond to bonus play or games having approximately the same payout value. Thus game groups are created for other than monetary reasons, such as similarity of play or location.

Bonus points, using machine readable indicia on a GBI or as part of the data kept in a back end database, readily provides for any combination of groupings and levels, allowing points sharing between gaming machines of designated groups but not between gaming machines not in the group (or level), at each casino's discretion. Such indicia may be as simple as assigning numerical equivalents to differing levels and groups from using a single byte of data, to being as complicated as using relational records in a database used to indicate relationships between gaming machines. The chosen implementation will depend on the needs of each casino.

At a minimum, "level" is used to refer to a set of bonus plays or bonus games that have been established to have an interchangeable underlying value with each other. Further, a "level" will typically correspond to bonus games, bonus plays, or bonus rounds that have an equivalent cost to the casino. This enables a casino to create a class of bonus games or bonus plays all enabled by the same bonus point value (a specified number of designated bonus points). This provides flexibility to both the casino and the players. It allows players to enjoy playing a variety of games while building bonus points, then further enables the player to win the bonus game of their choice (within a level) when they have accumulated enough bonus points.

A casino may define any number of bonus levels and use corresponding (assigned) bonus points. Illustrated are three levels, L One 1600, L Two 1602, and L Three 1604. In a preferred embodiment, L One corresponds to a set of bonus plays associated with the least expensive win amounts, while L Three corresponds to the most expensive, having higher pay outs. Depending on the overall goals of the casino, the various levels may be inter-related or kept entirely distinct. If kept distinct, a player may not use bonus points collected at one level towards play on another level.

One embodiment of inter-related levels is shown as 1606, where accumulated a specified number of bonus game points allows a player to invoke four L-1 bonus plays (1608), two L-2 bonus plays (1610), or one L-3 bonus play (1612). Clearly illustrated is the case where the expected payout relationship doubles between levels. This value relationship is completely up to the casino and may be embodied in any way, including non-linear relationships.

Further illustrated in FIG. 16 are several preferred embodiments of saving bonus credits over time. 1614 shows three saving methods. The top layer of 1614 corresponds to a situation where no bonus state may be saved off the game. There are no vouchers or back end database used for saving bonus points. In this case, if a player stops playing before they have won a bonus play or game, the next player to use the machine may continue to build the bonus credits. In the preferred embodiment, bonus credits of this type will always be aged or expire after a certain time period. The method used may be extremely simple, such as clearing all bonus credits once a day at, say, 5 AM. Another method provides for individually won bonus points to be aged for a designated amount of time before expiring, resulting in gradually increasing and decreasing totals as bonus points are won by players over time. Such aging policies are at the discretion of the casino, but are all done with the intent of enticing further game play by players.

The second layer shown in 1614 corresponds to a player who, having the choice to save bonus points, chooses not to and leaves them for the next player. This situation may readily arise in several ways, including the occasional visitor to a casino who would prefer to leave the bonus points for another player to use, rather than simply let the bonus expire before the player will return to the casino.

The third layer of 1614 is expected to be the most frequently used. This corresponds to a player storing, in some manner, the bonus points before stopping play. If the casino is a smaller casino and uses vouchers exclusively, then the player uses a bonus-out or cash-out button to have the machine issue a voucher with the bonus points thereon (the gaming machine will now read 0 bonus points). Other casinos may provide a choice, enabling a player to use a voucher or to store their bonus points on a back end database. A player may or may not associate the bonus points with a player ID of some kind. If no player ID is used, the gaming machine will issue a voucher having a unique identifier on it, allowing the player to retrieve their bonus points by inserting the voucher into a gaming machine which used the unique identifier to retrieve associated bonus points from a database. If a player uses a player ID of some kind, the addition information needed for the bonus points may be kept in additional fields in a record containing the player's information, or the player ID entry in a database may simply point to another record containing the associated bonus point information.

As will be readily apparent, the bonus points just described are an additional form of game state, and may be stored on a GBI (in one preferred embodiment, a GBI in the form of a voucher having human readable indicia thereon as well as machine readable indicia). The discussions above pertaining to apparatus, uses, forms, and methods for game state and GBIs apply fully and completely to bonus points as a form of game state. GBIs may have variable bonus point values, or bonus points, on an individual GBIs, as well as other game state data. Further, GBIs and GBIs in the form of vouchers having bonus point indicia readable by a player may further have any and all associated bonus point data included directly thereon, or may use the indicia to retrieve bonus point data from a database (this will typically be a pointer). Any data related to bonus points, collectively called bonus point data, includes but is not limited to numbers of bonus points at each level and expiration dates, creation time/date, or other date and time data needed to determine age associated with each bonus point or group of bonus points.

"Game indicia" is used to mean whatever form a payline or pay-out event might take in any particular game where the results displayed are based at least partially on a random event, which includes all well known games using chance such as reel games with various symbols on the reel that make up paylines, keno-like with matching numbers in a pattern, poker-like games with certain card combinations, etc., creating a payline or pay-out event in a primary game.

"Bonus play", "bonus games", or "secondary games" are used to mean any non-primary game, in the same gaming cabinet or not, where to be eligible to play or to invoke play, a player must first play a primary game whose results are based at least partially on a random event, and where the player becomes eligible to invoke or play at least one non-primary game based upon the results of one or more plays of one or more primary games. Thus, at a minimum, a player must play at least one primary game once and, as a result of playing, get a game event having game indicia which, when used with the games paytable, results in the player being enabled to play a non-primary game or game play.

Bonus points are won during game play upon the occurrence of designated game events (i.e., are added to a traditional game paytable), and as they are only redeemable for bonus plays on a bonus game either co-located in the gaming machine or separate from it, a player must continue to collect bonus points until they have enough to trigger a bonus event. The player need not trigger the bonus event on any particular gaming machine; if a player chooses, they may trade-in stored bonus credits at a kiosk to enable play at a secondary game separate from a primary game.

When considering bonus points, it needs to be kept in mind that bonus points provide an alternative way for a player to get to a bonus round during game play. The traditional way of getting to any of the bonus rounds is still present. A bonus round includes all variations, from a single secondary game play event to the playing of an entire secondary game of some kind with a plurality of individual plays being involved. The traditional method is the occurrence of a primary game event where the primary game indicia correspond to a paytable entry that puts the player into a bonus round.

The traditional method of winning bonus rounds will always be available; it is the availability of the traditionally invoked bonus round that makes the bonus points attractive to a player. A player sees that ordinarily, the bonus round is entered only rarely (or, not frequently enough for the player's personal enjoyment). It is in the desire to reach the somewhat elusive bonus round, previously only attainable through a small set of relatively rare game events, that makes bonus points attractive. It allows a player two ways of getting to a bonus round—the traditional way, with a direct win, and the gradual way, by collecting bonus points. Thus, bonus points provide a totally new path to a desirable game result: the invocation of a bonus round. The new path is unique, not the bonus round itself (although game implementers may well make use of the present invention and increase the number of secondary or bonus games available to players).

As used in the present disclosure, therefore, "bonus points" further includes the concept of creating a totally new path, usable by a player, to an existing reward or result, or to a reward or result also attainable via the occurrence of a game event corresponding to a paytable entry that provides for a direct win of the same reward or result. Put differently, bonus points lead to a result that is also attainable directly from an entry in the gaming machine's paytables. It is the frequency of the two occurrences that differs greatly. The direct win of the bonus round occurs rarely; the winning of bonus points occurs regularly.

Figure 17:
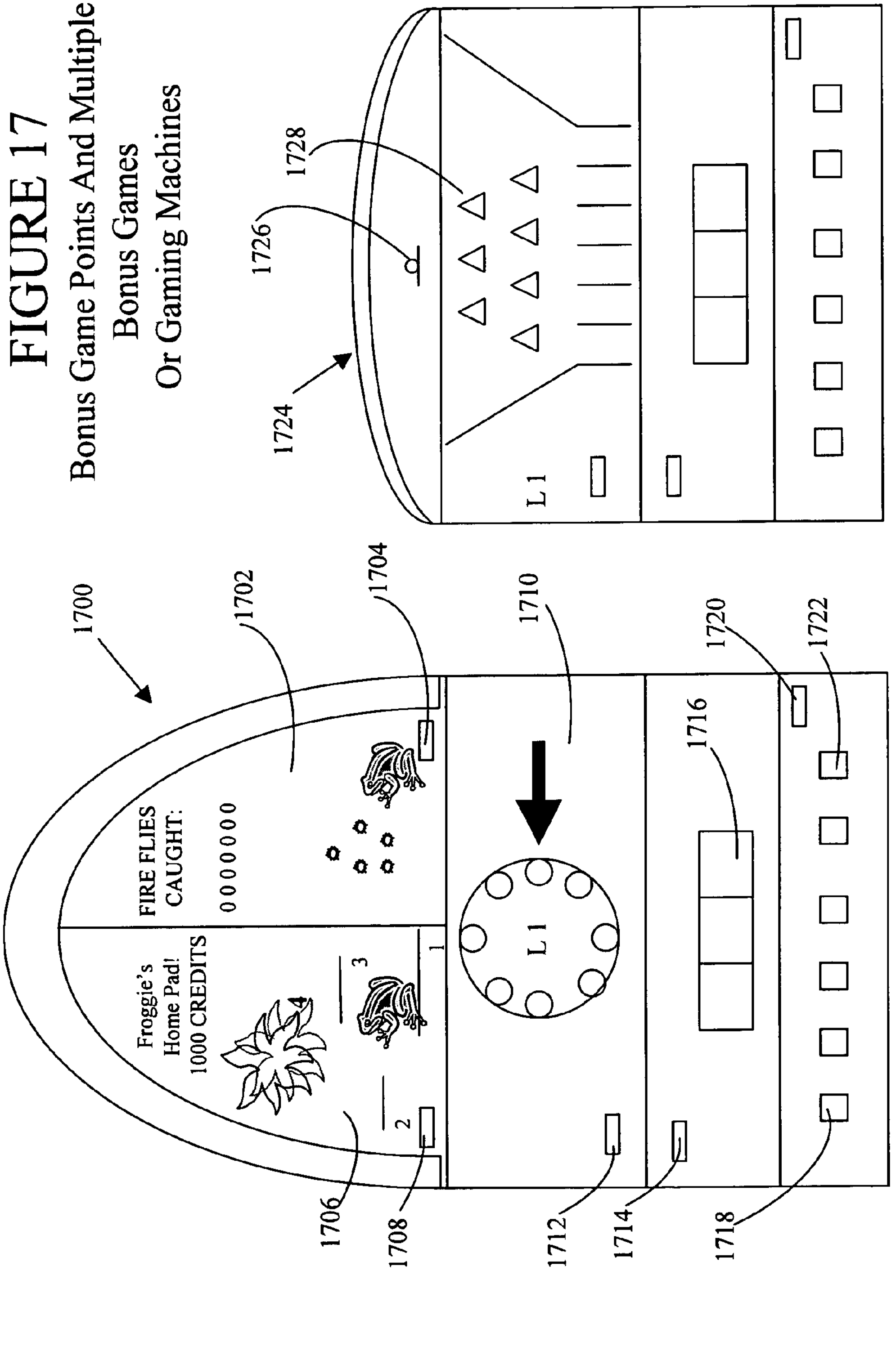
FIG. 17 is an illustration of bonus game points as they relate to different bonus games and gaming machines according to the present invention.

FIG. 17 illustrates gaming machines having multi-level secondary games, and further illustrates gaming machines enabling the use of bonus points at the same level but having differing secondary games. Game machine 1700 has three secondary games. Game 1702 is an L-2 game, involving a combination of skill and chance to win a middle-level bonus. It is played as described in FIG. 13. It further has a bonus point indicator 1704. Bonus point indicator 1704 shows the total number of bonus points applicable to this secondary game at any time. Bonus game 1706, played as described in FIG. 12, is an L-3 bonus game having the highest possible payout of the three. It has bonus point indicator 1708, which shows the number of bonus points applicable to that bonus game at any time.

Gaming machine 1700 further has a third bonus game 1710, an L-1 game having the lowest payouts. Shown is a simple wheel game, which upon being invoked pays out the amount closest to the large black arrow when movement stops. It also has a bonus point indicator 1712, which shows the total number of bonus points applicable to this level at any given time.

The three bonus point indicators will typically have different values in them as time progresses, and as different players either load in bonus points or use or store bonus points from the gaming machine.

Gaming machine 1700 (and 1724) further contain the normal components, internal and external, of gaming machines including a processor, memory, electrical connections, and input/output interfaces operably connected. Gaming device 1700 has a standard primary game with indicia window shown as 1716. The primary game may be any of the well known reel games, poker games, keno, bingo, fixed-pool games, etc. There is a panel of player buttons, shown between buttons 1718 and 1722, used for the primary game. Any layout and interface may be used, from a fixed number of physical buttons to a dynamic layout of touchscreen buttons. Also included is an output slot 1720 and an input slot 1714. Input slot 1714 accepts ID cards, ID vouchers, smart cards, game state vouchers, or any other means used to present gaming device 1700 with credits, states, or ID. If presented with ID, gaming device 1700 must be in operable communication with a back-end database (not shown), typically over a LAN (not shown). The communications means is used to retrieve bonus point data associated with the presented ID.

Gaming machine 1724 has a single secondary or bonus game, based on a standard pachinko game. Ball 1726 is released from its perch and, bouncing amongst pins 1728, comes to rest in one of slots along the bottom of the chute. Each slot will have an amount associated it, preferably determined dynamically. It is labeled as an L-1 game, meaning that a player may take bonus points won on gaming machine 1700 and use them (when enough are accumulated) to invoke play of the secondary pachinko game in gaming machine 1724. Thus, a player may enjoy the choice of any number of different L-1 bonus games when used with the bonus points they have accumulated.

Figure 18:
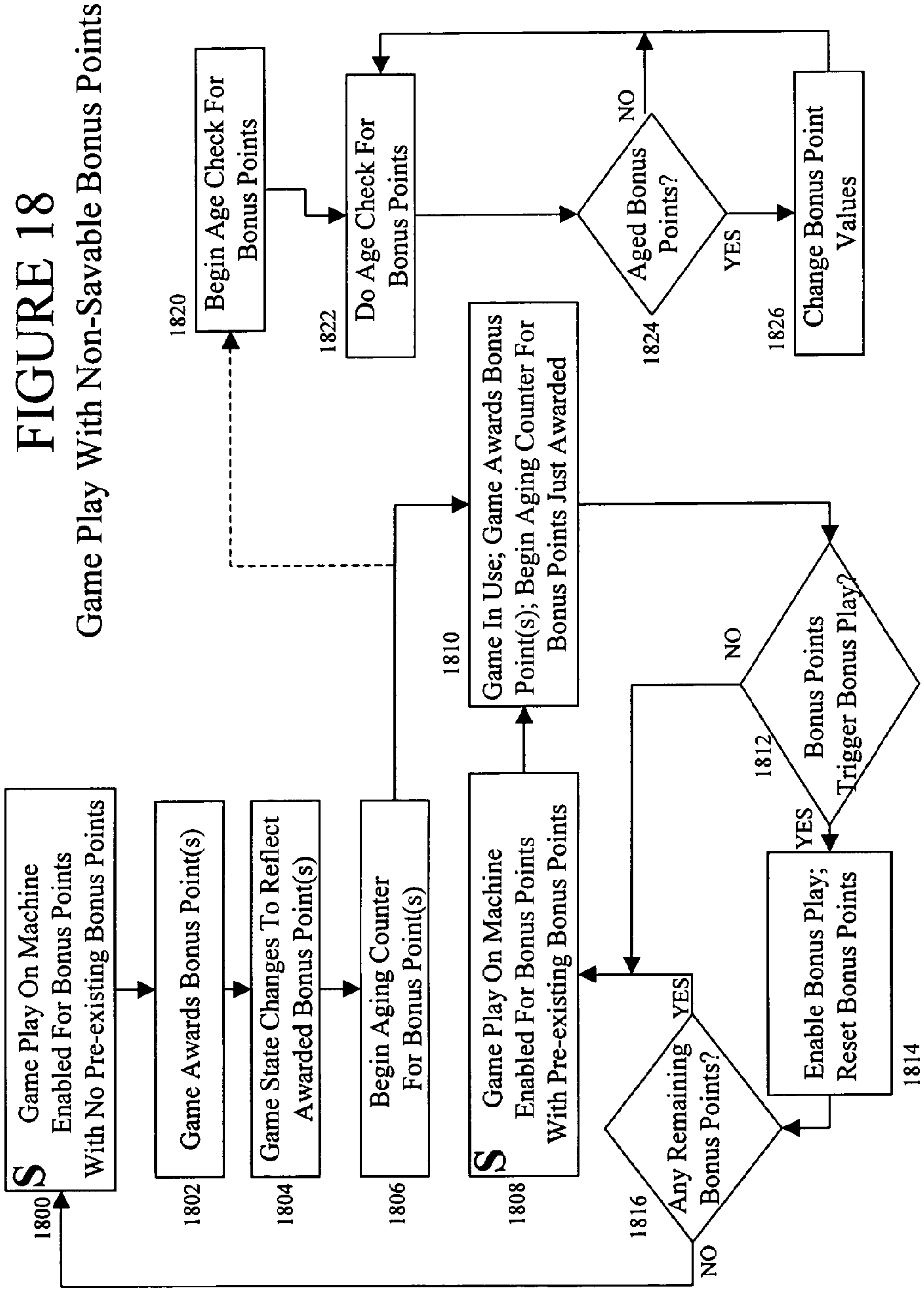
FIG. 18 is a flow diagram showing game play using non-savable bonus points in accordance with the present invention.

FIG. 18 illustrates game play when using non-savable bonus points. It is expected that this embodiment will be used in very small casinos, bingo halls, and similar place where there is no networking infrastructure, or perhaps no capability for a back end database, and further having no general voucher capabilities (small establishments often having pay out slips only).

There are two places a player may start, depending on the state of the gaming machine. One is block 1800 where there are no pre-existing bonus points, and the other is block 1808 where there are pre-existing bonus points, indicated by the bold "S". Beginning the description at block 1800, a player begins game play on a gaming machine enabled for bonus points and further having no bonus points on it. Continuing into block 1802, the game is played until a game event creates a bonus point award comprising at least one bonus point. Proceeding to block 1804, the game state is changed to reflect the newly won bonus points. In a preferred embodiment, a bonus point indicator as shown in FIG. 17 will show an increment in point value corresponding to the level (if there is more than one) and amount of bonus points just won. Next, block 1806 is entered.

Block 1806 corresponds to the actions needed to age the bonus points just won. This may be very simple or somewhat complex. A simple embodiment simply clears all bonus points at a predetermined time each day. In that case, nothing needs to be done in associating any time stamp data with the bonus points just won. In an alternative embodiment, bonus points will be aged for 24 hours from the date and time of the win, at which point they will expire and be removed from the current state of bonus points on the game (for each level, if more than level exists). A time stamp will then be kept with the bonus points just won in order to calculate how long the bonus points have been in existence.

Alternatively, a second or minute counter could be used, where aging is then determined by a simple compare of a fixed value with the current value of the counter. Any method or system for aging bonus points may be used and implemented; discussed are only representative examples. For each method used, there will be some type of time stamp, counter, or other information kept that will allow the age of the bonus points to be determined. Whatever form it takes, it will be called age data. Block 1806 is left and block 1810 entered.

The actions corresponding to block 1810 are a player continuing to use the gaming machine, with the game again awarding bonus points upon the event of a designated (in the paytable) game event. An aging counter is starting for these newly awarded bonus points. Note that the expression "aging counter" includes any form of date or time checking, from the most primitive (clearing all bonus points once a day) to the most complex, where bonus points are aged gradually, and may not refer to a literal counter. Whatever form bonus point aging takes, needed corresponding action is taken, if any. Block 1810 is left and diamond 1812 is entered.

The decision corresponding to diamond 1812 is to check and see if the points value at the level just awarded results in a bonus game or bonus play. Note that it will be possible, due to ability to win more than one bonus point, to have enough bonus points to invoke a bonus and have bonus points still left. If there enough bonus points to invoke bonus play, then the "YES" exit is taken to block 1814. The actions corresponding to block 1814 are to play the bonus game or bonus round. After completion of the bonus round, block 1814 is left and diamond 1816 is entered. The decision corresponding to diamond 1816 is to determine if there are any bonus points left. If there are, the "YES" exit is taken and block 1808 is re-entered.

If, at diamond 1816 there are no further bonus points, then the "NO" exit is taken and block 1800 is re-entered, with the sequence continuing as described above.

Returning to diamond 1812, if the addition of the newly won bonus points does not trigger a bonus play or bonus game, then the "NO" exit is taken, re-entering block 1808 and proceeding to take the corresponding action as discussed above.

Finally, returning to block 1806, a dotted line connection is shown to from block 1806 to block 1820 as well as a solid line connection to block 1810. This represents the fact that blocks 1820, 1822, 1824, and 1826 are a sequence that gets triggered by the actions corresponding to the first pass through of block 1806, but run independently thereafter. Thus, at the first pass through block 1806, the actions corresponding to block 1820 start. The actions corresponding to block 1820 are to begin the implemented age check of bonus points.

As discussed above the actual implementation may take many forms, but varies form a simple periodic resetting of all outstanding bonus points to zero, to checking, at a time increment set by the casino, the outstanding bonus points and either deleting or reducing any beyond a certain age. In the later case, one example might be to check ages every ½ hour, with any bonus point award or individual win (which will often be more than a single bonus point) more than 6 hours old being reduced by a specified number of bonus points, until reduced to zero. The reduction amount may be a percentage, or may be a fixed number such as 2. Clearly no remainders will be allowed, so point aging will use an algorithm that rounds to the nearest whole number of bonus points.

Block 1820 is left and block 1822 entered. The action corresponding to block 1822 is commence the age check of all outstanding bonus points at a predetermined interval (in the example above, upon the occurrence of every half hour). The process starts, checking each bonus point unit (bonus points awarded due to the same win) for its date and time of origin (when it was awarded) against the present date and time, calculating its age thereby. If the bonus point unit is not aged, the "NO" exit is taken and block 1822 is re-entered for that unit. If the answer is yes, the "YES" exit is taken to block 1826, where that bonus point unit is reduced by the value specified in the algorithm used by the casino. After the bonus points are reduced in value, a corresponding change is made to the bonus point values visible to a player. Block 1826 is left and block 1822 is re-entered, relative to that bonus point unit. After all bonus point units have checked (that is, each bonus point unit has gone through 1824 and back to 1822 or gone through 1824, 1826, then back to 1822) the process waits in block 1822 until the next specified time period occurs, then repeats.

Not addressed is the possible interaction between aging bonus points and active game use. Clearly, bonus points cannot be reduced while a game event is in the process of being produced (the time between a "start" button push or handle pull by a player and the play results); such game play is considered an atomic action, which once started runs to completion before any bonus point aging is carried out. Further, the bonus point aging will typically be very, very quick from a player's viewpoint (less than second), so may also be considered an atomic (uninterruptible) process once started. Thus, upon the occurrence of the time trigger in block 1822 to commence bonus point aging, if the game is in play the process waits until the present play is completed and any payouts, etc., determined. The aging process then runs, with appropriate warnings on the playing screen (such as: "Play more! Look at the bonus points being lost through age!"). As will be readily apparent to one of normal skill in the game development art and with the benefit of the present disclosure, any number of readily implementable ways of handling the aforementioned process coordination are available.

Figure 19:
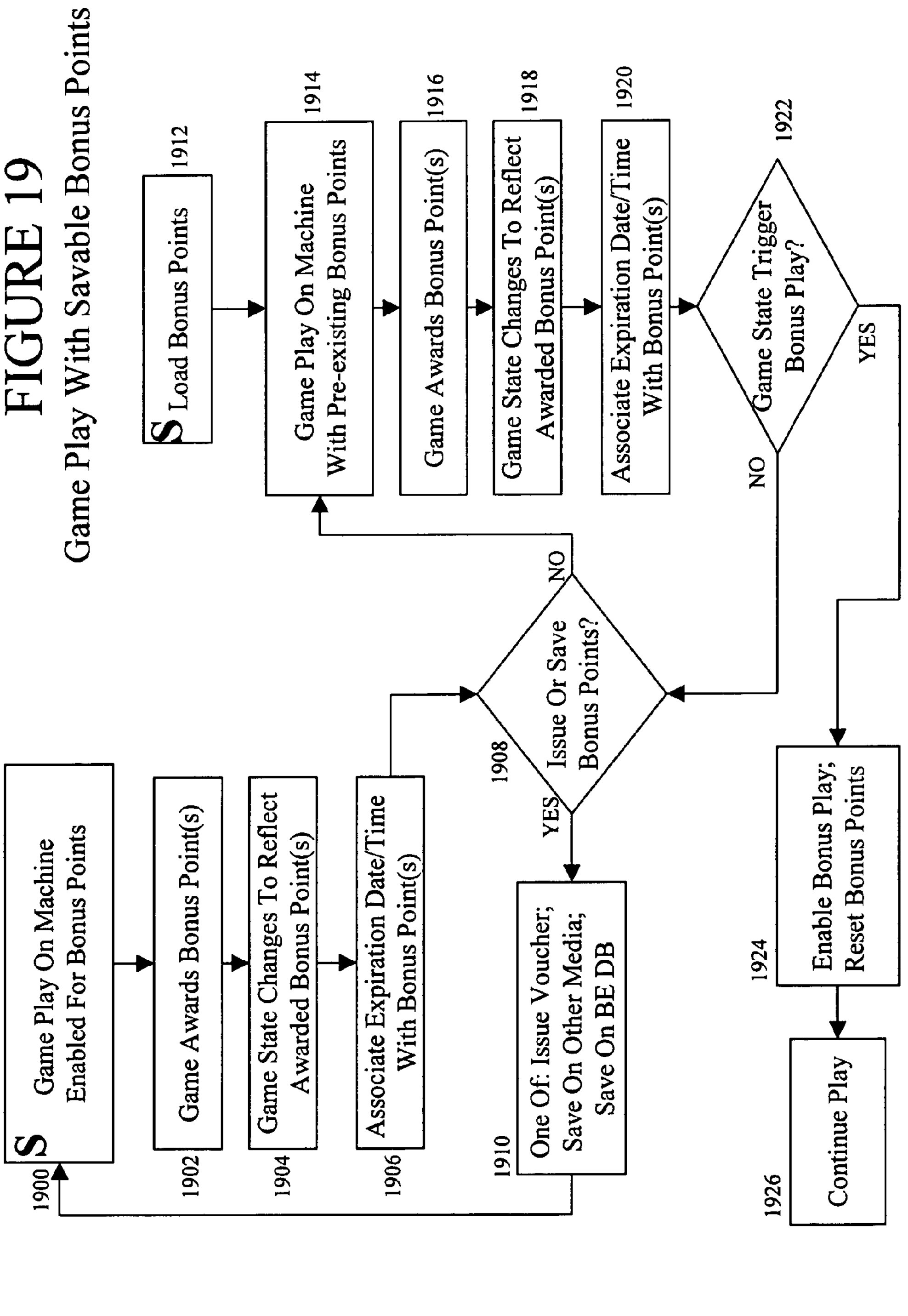
FIG. 19 is a flow diagram showing game play using savable bonus points in accordance with the present invention.

FIG. 19 shows a method of using bonus points that are savable. The process may start at either block 1900 or block 1912, indicated by the bold "S" in each block. Starting the description at block 1900, game play commences at a gaming machine enabled for bonus point awards or winning events and having no pre-existing bonus points. Proceeding to block 1902, the action is the awarding or winning of bonus points upon the occurrence of a game event having indicia corresponding to bonus point(s) win(s) in the gaming machine's paytable. Continuing on to block 1904, the game state is changed to reflect the bonus points just won. This will typically be both internal (memory change) and external (updating a display visible to a user). Entering block 1906, a time stamp or counter of some kind is associated with the bonus point unit just awarded or won. Note that in the simplest case of clearing bonus points at a fixed periodic time, this may not be needed. Block 1906 is left and diamond 1908 entered.

The answer corresponding to diamond 1908 is to determine if the player wants to issue or save the just won bonus points. If the player saves or issues the bonus points, the bonus points would not be available to increment the counters on the game, being usable by the player at a later time. If the player does chose to reserve the bonus points for later use, the "YES" exit is taken to block 1910. The action corresponding to block 1910 is to save or issue the bonus points in a manner (i) enabled on the current gaming machine and (ii) chosen by the player. They may be saved on a back end database, on a voucher/GBI, on a mag stripe card, etc. Whatever form it takes, the bonus points are made available for later use by player and not current use. Block 1910 is left and the process repeats, starting at block 1900.

If, at diamond 1908, the player decides to make use of the bonus now, the "NO" exit is taken to block 1914. The action corresponding to block 1914 is that game play commences on a gaming machine with some bonus points already part of the game state of the machine. Typically this will be displayed for the player on a visible display, as well as being kept internally. Block 1914 is left for block 1916, where, during continuing play, a game play event occurs which corresponding to a bonus point win in the gaming machines paytable. The bonus point(s) is or are awarded, and, continuing into block 1918, the internal game state is changed to reflect the new values of the bonus points (including changes to one level of game points, if multi-level bonus points are in use). Further, flowing into block 1920, time and date information, a counter, or some means usable for determining age is associated with the just won bonus point unit (comprised of one or more bonus points). Block 1920 is left and diamond 1922 is entered.

The question to be answered in diamond 1922 is to determine of the newly awarded bonus points triggers (due to total numbers) a bonus game or bonus play. If it does not, then the "NO" exit is taken to diamond 1908, where, as described above, the player is asked if the wish to leave the bonus points in the current game state. If the answer at diamond 1922 is "YES", then the "YES" exit is taken to block 1924. Actions corresponding to block 1924 include enabling bonus game or bonus play, and resetting the overall count of the bonus points accordingly (the points reduced by the correct amount and if levels are being used, at the correct level). Note that "enabling" a bonus game or bonus play may or may not require a player to make use of the bonus game at that time, depending on the game setup. For example, enabling may comprise allowing a player to enter a secondary game kiosk and play an entirely different game at a different location. Or, it may simply trigger one of the available bonus games implemented in the same physical box as the primary game. In all cases, after enablement and in some cases playing a bonus round, block 1924 is left for block 1926. Block 1926 is really a "paper hyper link", propelling the process to either block 1900 or block 1912, depending on the current bonus point state.

Note that a player may start interacting with a gaming machine at block 1912 by first retrieving bonus points available to the player. This may take any of the forms discussed above, including but not limited to voucher/GBI, a player ID which the gaming machine uses to retrieve associated bonus point data from a database connected by a network to the gaming machine, etc. After initial loading of bonus point data, the process continues into block 1914 as described above.

Note that the process described in FIG. 19 is especially amenable to changes in order and processing steps, and will depend on the casino. For example, one casino may decide to have block 1920 lead to diamond 1908, and allow a player to save bonus points even though there are now enough bonus points to invoke or enable a bonus game. Many other such variations will be readily apparent to a person of ordinary skill in the art who has the benefit of the present disclosure.

Although presented in the context of a single casino, the present system lends itself to multi-establishment implementations amongst cooperating entities. This may be accomplished by simply sharing bonus point data between establishments, based on a common unique ID held by the user, or alternatively established for this player by the casinos. Clearly some form of cross-compensation for the value of bonus points would be agreed to between cooperating entities, but this would enable players to use the same bonus points at similar gaming machines across multiple establishments.

The game state manager also has the ability to properly handle bonus points, which are much simpler than other game state management tasks such as managing secondary bonus game play states. If a casino has only bonus points and no other savable game state, then the game state manager becomes a bonus point manager, having the tasks of: keeping tallies and aging information about bonus points as they are won by a player; or, converting forms of bonus points as specified by a player in the event the casino has multi-level bonus games and further allows transfer of bonus points between layers (not all casinos will chose to allow this). Such conversions may be made at a GBI service station or on individual gaming machines. If a gaming machine is used, a player invokes a screen having a set of pre-defined choices for converting what the player has into other forms, including the enablement of a bonus game at a location (gaming machine of game kiosk) that is different from the presently used gaming machine.

And as always, if a player is confused they may use a customer service counter, interacting with a human who can explain options to them.

The present invention has been partially described using flow charts. As will be understood by a person of ordinary skill in the art and with the benefit of the present disclosure, steps described in the flow charts can vary as to order, content, allocation of resources between steps, times repeated, and similar variations while staying fully within the inventive concepts disclosed herein.

Accordingly, it will be seen that this invention provides a system and method for awarding and maintaining a player's bonus credits, which are one form of game states, usable to enable a secondary or bonus game and further to enable clustering or grouping of bonus games or secondary games into levels or groups, each with their won bonus credits. The savable game states may be saved on a game state voucher or any other media-based implementation or may be saved in strictly softcopy (electronic or other means) form. Any savable game state, in whatever form it is stored, comprises savable game state. The saving of game states provides for the promotion of continued play in a gaming environment.

A player may restore bonus credits and/or other game state from previously played games when the currently gaming device matches the level or type of stored bonus credits. This will be managed by the game state manager. For example, saving bonus point state from one game results in a voucher (or other instrument, or data in a database) that may then be re-inserted and used in any game where the game and wagering amount encompass the same bonus point unit as held on the voucher or other transportable media.

Although the description above contains much specificity, the description should not be construed as limiting the scope of the invention but as merely providing an illustration of the presently preferred embodiment of the invention. The scope of this invention should be determined by the appended claims and their legal equivalents.

What is claimed is:

1. A method of using gaming machines in a casino gaming environment comprising:

creating two or more groups of casino-style gaming machines;

issuing one or more bonus points as a result of play of a non-bonus game at a first gaming machine associated with a first group of the created groups;

wherein the one or more bonus points are stored in a database and redeemable for play of a bonus game at the first gaming machine and a second gaming machine belonging to the first group and invalid for redemption for play of a bonus game at a third gaming machine belonging to a second group of the created groups, wherein the bonus game at the first gaming machine is initiatable in a first mode and a second mode, wherein the first mode includes an occurrence of an event during play of the non-bonus game and the second mode includes a redemption of the one or more bonus points; and initiating play of the bonus game for which the one or more bonus points was redeemed.

2. The method of claim 1, wherein the one or more bonus points further comprise age data associated with the one or more bonus points, wherein the one or more bonus points expires according to a predetermined algorithm.

3. The method of claim 1, wherein the bonus games within each group of gaming machines have an essentially equivalent cost to the casino.

4. The method of claim 1, wherein the gaming machines are grouped according to similarity of play.

5. The method of claim 1, wherein the gaming machines are grouped according to location.

6. The method of claim 1, wherein play of the bonus game for which the one or more bonus points is redeemable may also be initiated as a direct result of a paytable entry of the non-bonus game of the second gaming machine, such direct initiation less likely to occur than the issuance of each of the one or more bonus points.

7. The method of claim 1, wherein the second mode is initiated by a player separate from initiation of the non-bonus game.

8. The method of claim 1, wherein the first mode is initiated separate from initiation of the non-bonus game.

* * * * *

UNITED STATES PATENT AND TRADEMARK OFFICE

CERTIFICATE OF CORRECTION

PATENT NO. : 8,317,601 B1
APPLICATION NO. : 09/971853
DATED : November 27, 2012
INVENTOR(S) : Robert Anthony Luciano, Jr.

It is certified that error appears in the above-identified patent and that said Letters Patent is hereby corrected as shown below:

In the Specifications:

Column 4, In line 61, replace “illustrations” with --illustrates--

Column 7, In line 34, replace “use” with --used--

Column 15, In line 38, insert --to-- before “instruct”

Column 15, In line 63, remove “a”

Column 17, In line 36, replace “addition” with --additional--

Column 20, In line 58, remove “to” after “shown”

Column 21, In line 41, insert --it-- after “so”

Signed and Sealed this
Twenty-first Day of May, 2013

Teresa Stanek Rea
*Acting Director of the United States Patent and Trademark Office*